(12) United States Patent
Azuma

(10) Patent No.: US 7,804,502 B2
(45) Date of Patent: Sep. 28, 2010

(54) METHOD OF CAUSING FIRST OBJECT TO TAKE MOTION ACCORDING TO POSITIONAL RELATIONSHIP WITH SECOND OBJECT

(75) Inventor: Shin Azuma, Kobe (JP)

(73) Assignees: Kabushiki Kaisha Square Enix, Tokyo (JP); Nintendo Co., Ltd, Kyoto (JP)

( * ) Notice: Subject to any disclaimer, the term of this patent is extended or adjusted under 35 U.S.C. 154(b) by 872 days.

(21) Appl. No.: 11/538,573

(22) Filed: Oct. 4, 2006

(65) Prior Publication Data
US 2007/0139419 A1 Jun. 21, 2007

(30) Foreign Application Priority Data
Oct. 4, 2005 (JP) ............................ P2005-291802

(51) Int. Cl.
G06T 13/00 (2006.01)
G06T 15/70 (2006.01)
A63F 9/24 (2006.01)

(52) U.S. Cl. .......................................... 345/473; 463/4

(58) Field of Classification Search ..................... 463/4; 345/473
See application file for complete search history.

(56) References Cited

U.S. PATENT DOCUMENTS

| 6,149,520 | A * | 11/2000 | Takatsuka ....................... 463/4 |
| 6,947,046 | B2 | 9/2005 | Nimura et al. |
| 2003/0040362 | A1 | 2/2003 | Egashira |
| 2003/0043154 | A1 | 3/2003 | Nimura et al. |
| 2003/0195039 | A1 | 10/2003 | Orr et al. |
| 2004/0130525 | A1 | 7/2004 | Suchocki |
| 2005/0159217 | A1 | 7/2005 | Tawara |

FOREIGN PATENT DOCUMENTS

EP 0836871 4/1998

(Continued)

OTHER PUBLICATIONS

Lindsay, Ken. "Dribbling." Internet Archive: Wayback Machine. Jun. 16, 2009 <http://web.archive.org/web/20040925075543/http://www.guidetocoachingbasketball.com/dribbling.htm>. Accessed from the Internet Archive the version of the page available on the Internet on Sep. 25, 2004.*

(Continued)

Primary Examiner—Xiao M Wu
Assistant Examiner—Scott E Sonners
(74) Attorney, Agent, or Firm—Greenblum & Bernstein, P.L.C.

(57) ABSTRACT

When a direction is input through a direction indicating switch of an operation switch unit, a player character of a game, such as, but not limited to, for example a basketball game, moves in the inputted direction while dribbling a ball. When a direction directed toward the position of the ball from the position of the player character matches with the inputted direction, the moving speed of the player character becomes V. When the direction directed toward the position of the ball from the position of the player character does not match with the input direction, the moving speed of the player character becomes Vcos(θ/2) where θ is an angle defined by the direction directed toward the position of the ball from the position of the player character and the inputted direction.

16 Claims, 11 Drawing Sheets

FOREIGN PATENT DOCUMENTS

| | | |
|---|---|---|
| EP | 0836871 | 4/1999 |
| EP | 1570886 | 9/2005 |
| GB | 2390308 | 1/2004 |
| JP | 11-090046 | 4/1999 |
| JP | 2003-044219 | 2/2003 |
| JP | 2003-044219 A | 2/2003 |
| JP | 2003-062326 | 3/2003 |
| JP | 2003-067773 | 3/2003 |

OTHER PUBLICATIONS

English Language Abstract and English Language Translation of Paragraphs [0099]-[0113] of JP 2003-062326.

English Language Abstract and English Language Translation of Paragraphs [0007]-[0009] and [0103]-[0117] of JP 2003-067773.

U.S. Appl. No. 11/538,592 to Azuma, filed Oct. 4, 2006.

English language Abstract of JP 2003-044219 A, Feb. 14, 2003.

English Language Abstract of JP 11-090046.

Mattel Inc., "Instructions: International Soccer," Online, retrieved from URL:http://www.atariage.com/manual_html_page.html?Software LabelID=249, referring to the game International Soccer for Atari, Mattel Inc., 1982, XP002415098.

Goller, "Bolo," Power Play, Online, retrieved from URL:http://www.kultboy.com/index.php?site=testb/testb&testb=game&id=1536, referring to the game Bolo by Ash, 1995 by dongleware XP002415099, and an English language translation of cols. 2 and 3.

Sega Corp, Visual Concepts Entertainment, "ESPN NBA Basketball—Enhanced Manual for Xbox", Oct. 21, 2003, pp. 1-9, XP002432933.

Konami, "Pro Evolution Soccer 4", Manual, Oct. 15, 2004, XP002432934.

Audiogenic, Emlyn Hughes International Soccer Manual, Oct. 1998, pp. 1-10, XP002432935, URL:http://www.ehis64.net/manual.php.

Anco Software Limited, "KICKOFF02", Instruction Booklet, 2002, XP002432936, pp. 5-8.

\* cited by examiner

FIG.4A
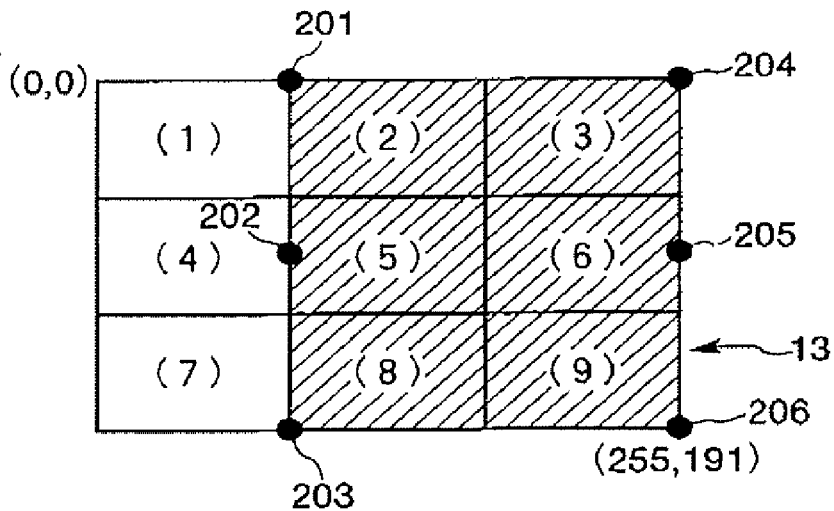
FIG.4B
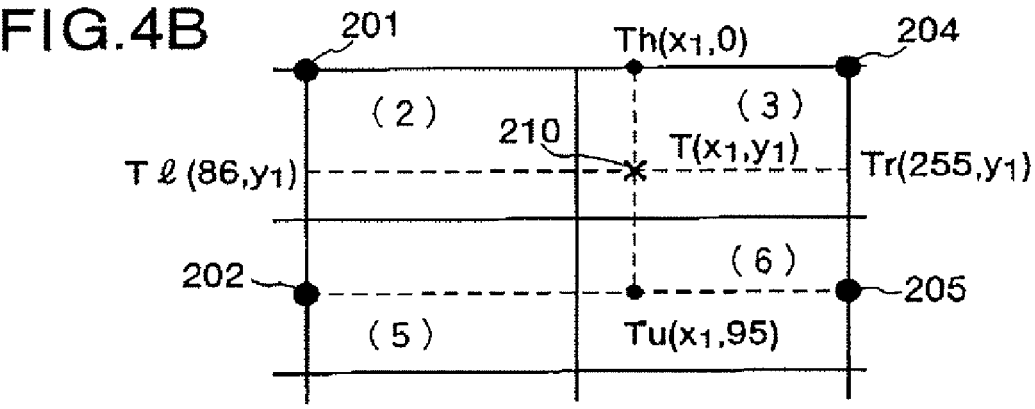
$$\overline{TTh} : \overline{TTu} = H : U$$
$$\overline{TT\ell} : \overline{TTr} = L : R$$
FIG.4C
$$B(201) = \frac{R}{L+R} + \frac{U}{H+U}$$
$$B(202) = \frac{R}{L+R} + \frac{H}{H+U}$$
$$B(204) = \frac{L}{L+R} + \frac{U}{H+U}$$
$$B(205) = \frac{L}{L+R} + \frac{H}{H+U}$$

| | |
|---|---|
| R(2) → L(1) | R(8) → L(1) |
| → L(4) | → L(4) |
| → L(7) | → L(7) |
| → R(8) | → R(2) |
| → R(9) | → R(3) |
| R(3) → L(1) | R(9) → L(1) |
| → L(4) | → L(4) |
| → L(7) | → L(7) |
| → R(8) | → R(2) |
| → R(9) | → R(3) |
| R(5) → L(1) | R(6) → L(1) |
| → L(4) | → L(4) |
| → L(7) | → L(7) |

START INTERPORATION    LINK MOTION    END INTERPORATION

METHOD OF CAUSING FIRST OBJECT TO TAKE MOTION ACCORDING TO POSITIONAL RELATIONSHIP WITH SECOND OBJECT

CROSS REFERENCE TO RELATED APPLICATION

The present disclosure relates to subject matter contained in Japanese Patent Application No. 2005-291802, filed on Oct. 4, 2005, the disclosure of which is expressly incorporated herein by reference in its entirety.

BACKGROUND OF THE INVENTION

1. Field of the Invention

The present invention relates to a technique of generating a motion image of a first object in a virtual space where the first object and a second object are present, in accordance with a positional relationship between the first object and the second object.

2. Description of the Related Art

In three-dimensional video games, a motion image of an object like a character which is present in a virtual three-dimensional space is generated by performing perspective transformation on the range of the virtual three-dimensional space including the object with a virtual camera. In such three-dimensional video games, in addition to a player character that takes a motion according to an operation of a player, many other objects like enemy characters who play against the player character are present in the virtual three-dimensional space.

When many other objects are present in a virtual three-dimensional space, the motion of an object may be affected by external forces, such as, for example, one applied from another object. Japanese Patent Laid-Open Publication No. 2003-62326 and Japanese Patent Laid-Open Publication No. 2003-67773 disclose a scheme of changing the individual blend ratio of motion data of a first object (e.g., a weapon owned by a player character) for each bone set for the first object when the first object hits a second object (e.g., an enemy character). This makes it possible to generate an image that is reproduced in accordance with an influence originating from external force applied to an object from another object.

When another object is present, however, the actions of human beings and animals are affected by the object even though no external force is directly applied therefrom. For example, human beings may take an action while observing an object, such as, for example, chasing a ball in a ball game. Moreover, human beings may change a direction, for example, while walking to avoid an obstacle (such as, for example, an object). Such a human action that is affected by another object is often performed subconsciously.

An operation pad of a game machine through which a player (or user) inputs an instruction for a character to take a motion has a limited number of directional keys for inputting a direction, and a limited number of buttons for inputting individual instructions. Thus, the kinds of inputtable instructions are limited. This makes it impossible for the player (or user) to input a different instruction due to the presence of another object. When the player instructs the same motion, the character may take the same motion regardless of where the other object is.

If the kinds of instructions inputtable through the operation pad increase, when an instruction is input, it becomes difficult for the player to intuitively determine how the character takes a motion, or what positional relationship another object has set with respect to the character. An increase in the kinds or instructions inputtable through the operation pad may frequently result in making an erroneous input of an instruction not intended by the player, or may delay inputting of the player's instruction. Apparently, an increase in the kinds of the instructions inputtable through the operation pad makes a game too complex.

SUMMARY OF THE INVENTION

It is a primary object of the invention to generate an image such that a first object can take a different motion due to the presence of a second object in a virtual space where the first and second objects are present, even if an operator instructs the same motion.

It is a secondary object of the invention to generate an image such that a positional relationship between a first object and a second object is defined by an intuitive input of an operator in a virtual space where the first and second objects are present.

An image generating apparatus according to the first aspect of the invention generates an image of a virtual space where a first object and a second object are present. The image generating apparatus includes a motion input unit that inputs a motion instruction for causing the first object to take a motion in the virtual space according to an operation of an operator. The image generating apparatus also includes a positional relationship determining unit that determines a positional relationship between the first object and the second object when the motion instruction is input. The image generating apparatus further includes an object motion unit that causes the first object to take a motion according to the input motion instruction in such a way that the motion differs according to the positional relationship between the first object and the second object. The image generating apparatus further includes an image generating unit that generates the image of the virtual space including the first object and the second object. The image generating apparatus further includes a display control unit that displays the generated image of the virtual space on a display unit.

According to the image generating apparatus of the first aspect, the first object is caused to take a motion according to the instruction input through the motion input unit in such a way that the motion differs according to the positional relationship between the first object and the second object. Thus, it is possible to prevent the first object from taking an unnatural motion with respect to the position of the second object. Because it is unnecessary to separately use an instruction input by the operator for causing the first object to take an appropriate motion with respect to the position of the second object, inputting an instruction for causing the first object to take a motion does not become complex.

The object motion unit includes an object direction changing unit that changes the direction of the first object according to the inputted moving direction in such a way that the first object faces in different directions according to the positional relationship between the first object and the second object.

The image generating apparatus further includes a first direction determining unit, a second direction determining unit, a motion data determining unit. The first direction determining unit determines whether an inputted moving direction lies within a first specific range with respect to the direction from the position of the first object toward the position of the second object. The second direction determining unit determines whether the inputted moving direction is outside of a second specific range with respect to the direction in which the first object faces. The object direction changing unit changes the direction of the first object in the inputted moving direction when it is determined that the inputted moving direction lies within the first specific range, faster than when it is determined that the inputted moving direction is outside of the first specific range where it is determined that the inputted moving direction is outside the second specific range. An image generating apparatus according to the second aspect of the invention generates an image of a virtual space where a first object and a second object are present. The image generating apparatus includes a direction input unit that inputs a moving direction in a plurality of predetermined directions to move a position of the first object from a current position according to an operation of an operator. The image generating apparatus also includes an object movement unit that moves the first object in the inputted moving direction. The image generating apparatus further includes a coordinate position input unit that inputs an arbitrary coordinate position on a two-dimensional plane according to the operation of the operator. The image generating apparatus further includes a positional relationship setting unit that sets a positional relationship between the first object and the second object based on the input coordinate position. The image generating apparatus further includes a second object disposing unit that disposes the second object at a position in the virtual space according to the set positional relationship with respect to the moved position of the first object. The image generating apparatus further includes an image generating unit that generates the image of the virtual space including the moved first object and the second object. The image generating apparatus further includes a motion data determining unit that determines motion data defining a motion of the first object according to the positional relationship set by the positional relationship unit. The image generating apparatus further includes a display control unit that displays the generated image of the virtual space on a display unit.

In the image generating apparatus according to the second aspect, the first object moves in the virtual space in a moving direction input through the direction input unit by the operator. As the operator inputs a coordinate position on the two-dimensional plane while the first object is moving, the positional relationship between the first object and the second object is set according to the input coordinate position, thereby disposing the second object in accordance with the position of the first object which is moving in the virtual space. To make the operator dispose the second object at a desired position with respect to the first object moving in the virtual space, it is sufficient for the operator to input the coordinate position on the two-dimensional plane through the coordinate position input unit. This makes it possible for the operator to perform intuitive input operation, so that operation does not become complex.

An image generating apparatus according to the third aspect of the invention generates an image of a virtual space where a first object and a second object are present. The image generating apparatus includes a storage that stores a program, a processor that executes the program, a motion input device that inputs a motion instruction for causing the first object to take a motion according to an operation of an operator, and a display device that displays an image.

The program includes a code section that determines a positional relationship between the first object and the second object when the motion instruction is input. The program also includes a code section that causes the first object to take a motion according to the input motion instruction in such a way that the motion differs according to the positional relationship between the first object and the second object. The program further includes a code section that generates the image of the virtual space including the first object and the second object. The program further includes a code section that displays the generated image on the display device.

An image generating apparatus according to the fourth aspect of the invention generates an image of a virtual space where a first object and a second object are present. The image generating apparatus includes a program memory that stores a program, a processor that executes the program, a direction input device that inputs a moving direction for moving the first object according to an operation of an operator, a coordinate position input device that inputs an arbitrary coordinate position on a two-dimensional plane according to the operation of the operator, and a display device that displays an image.

The program includes a code section that moves the first object in the inputted moving direction. The program also includes a code section that sets a positional relationship between the first object and the second object based on the input coordinate position on the two-dimensional plane. The program further includes a code section that generates the image of the virtual space including the moved first object and the second object. The program further includes a code section that displays the generated image on the display device.

The program stored in the program memory in the image generating apparatus according to the third or fourth aspect can be recorded in a computer readable recording medium for distribution. The computer readable recording medium may be a recording medium which is configured attachable and detachable to and from the image generating apparatus, and is provided separately from the image generating apparatus. The computer readable recording medium may be a recording medium, such as a fixed disk device, which is installed in the image generating apparatus, and provided together with the image generating apparatus. A data signal of the program stored in the program memory in the image generating apparatus according to the third or fourth aspect can be superimposed on a carrier wave by a server unit present on a network, so that the program can be distributed over the network.

According to the fifth aspect of the invention, there is provided a method of generating an image of a virtual space where a first object and a second object are present. The method is executed by a computer device having a motion input device that inputs a motion instruction for causing the first object to take a motion according to an operation of an operator, and a display device that displays an image.

The method determines a positional relationship between the first object and the second object when the motion instruction is input. The method causes the first object to take a motion according to the input motion instruction in such a way that the motion differs according to the positional relationship between the first object and the second object. The method generates the image of the virtual space including the first object and the second object. The method displays the generated image on the display device.

According to the sixth aspect of the invention, there is provided a method of generating an image of a virtual space where a first object and a second object are present. The method is executed by a computer device having a direction input device that inputs a moving direction for moving the first object according to an operation of an operator, a coordinate position input device that inputs an arbitrary coordinate position on a two-dimensional plane according to the operation of the operator, and a display device that displays an image.

The method moves the first object in the inputted moving direction. The method sets a positional relationship between the first object and the second object based on the input coordinate position on the two-dimensional plane. The method generates the image of the virtual space including the moved first object and the second object. The method displays the generated image on the display device

BRIEF DESCRIPTION OF THE DRAWINGS

FIGS. 4A to 4C are explanatory diagrams of motion blending when a player character stops at an arbitrary position on a court and dribbles;

DETAILED DESCRIPTION OF THE PREFERRED EMBODIMENTS

Embodiments of the present invention will be described below with reference to the accompanying drawings.

Figure 1:
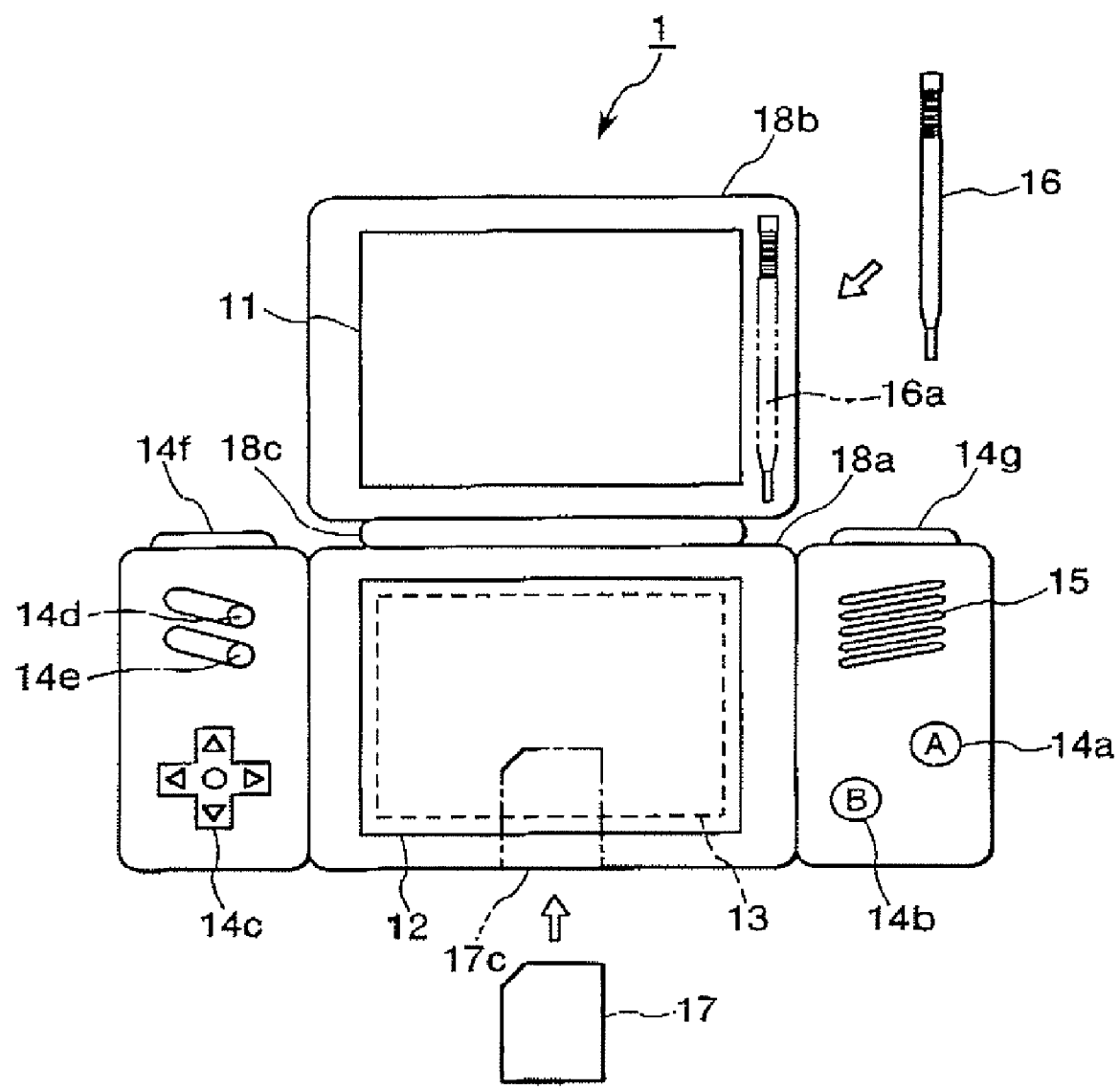
FIG. 1 is an external view showing the structure of a game machine according to an embodiment of the present invention.

FIG. 1 is an external view showing the structure of a game machine 1 which is adapted to an embodiment of the invention. FIG. 1 shows a portable game machine as one example of the game machine 1. Referring to FIG. 1, the game machine 1 comprises two liquid crystal displays (LCDs) 11 and 12 in a housing 18.

The housing 18 comprises a lower housing 18a and an upper housing 18b. The upper housing 18b has the first LCD 11, and the lower housing 18a has the second LCD 12. The upper housing 18b is rotatably supported by, for example, a hinge mechanism 18c, at a portion where the upper housing 18b contacts the lower housing 18a (for example, at a part of the upper side of the lower housing 18a). The upper housing 18b has a planar shape slightly larger than the planar shape of the first LCD 11, and has an opening formed therein to expose the display screen of the first LCD 11. The lower housing 18a has a planar shape laterally longer than that of the upper housing 18b, and has an opening formed in the lateral center portion to expose the display screen of the second LCD 12. The lower housing 18a has apertures formed therein for sound from a speaker 15 to pass through, the apertures being located to the right side of the second LCD 12. An operational switch unit 14 (which is referred to by the single designator "14" in order to simplify the description of the embodiment, but which refers to a system of actuators, including a plurality of switch actuators 14a-14g shown in FIG. 1) is mounted to the right and left sides of the lower housing 18a, sandwiching the second LCD 12. The operational switch actuator system 14 (also referred to as operational switch unit 14) includes a motion switch (A button) 14a, a motion switch (B button) 14b, a direction indicating switch (cross keys) 14c, a start switch 14d, a select switch 14e, first side switch (L button) 14f, and second side switch (R button) 14g. The motion switches 14a and 14b are mounted on one major surface of the lower housing 18a to the right side of the second LCD 12. The direction indicating switch 14c, the start switch 14d and the select switch 14e are mounted on one major surface of the lower housing 18 to the left side of the second LCD 12. The first and second side switches 14f and 14g are mounted on an upper surface (upper side face) of the lower housing 18a to the left and right sides, respectively, thereof.

The motion switches 14a and 14b are an input device to input an action of a player character, such as causing the player character to make a pass or shoot, in the basketball game according to one embodiment. The direction indicating switch 14c is an input device to input a direction in which an object (a player character or a cursor) is moved on a game screen. The direction indicating switch 14c is constituted, for example, by cross keys, but may be constituted from any other mechanism capable of inputting directional signals as the skilled artisan will readily appreciate without departing from the spirit and/or scope of the invention. A player can simultaneously manipulate two adjoining keys (up and right keys, right and down keys, down and left keys, or left and up keys) in the cross keys of the direction indicating switch 14c. Operating the direction indicating switch 14c, the player can input one direction of eight directions (up, down, left and right directions specified by manipulation of one key, and upper right, lower right, upper left and lower left directions specified by simultaneous manipulation of adjoining two keys).

A touch panel 13 (broken-line area in FIG. 1 is mounted on the top side of the second LCD 12. The touch panel 13 is an input device which detects a coordinate position of a stick 16 (such as, for example, a stylus, or the like) when the player presses or moves the stick 16 (or a player's finger) on the top side of the touch panel 13, or strokes the top side of the touch panel 13 with the stick 16 (or the finger). The touch panel 13 detects the coordinate position of the stick 16 with any sensing system, such as the use of a resistive film, an optical system (infrared system), or a static capacitance coupling system. In the basketball game example of an embodiment, the player uses the touch panel 13 to input the position of a ball where a player character dribbles when the player character is dribbling the ball.

A retaining area 16a (two-dot chain line area in FIG. 1) for storing the stick 16 that operates the touch panel 13 is formed in a vicinity of one side face of the upper housing 18b. The stick 16 is retained in the retaining area 16a. Formed in a part of one side face of the lower housing 18a is a cartridge inserting section 17c where a game cartridge 17 (hereinafter simply referred to as "cartridge 17") incorporating a memory (e.g., ROM) storing a game program is detachably loaded. The cartridge 17 is an information storage medium storing a game program. A non-volatile semiconductor memory, such as a ROM or a flash memory, is used as the cartridge 17. A connector 28 (see FIG. 2) for electric connection to the cartridge 17 is provided inside the cartridge inserting section. An electronic circuit board having various electronic parts like a CPU mounted thereon is housed in the lower housing 18a (and/or the upper housing 18b).

Figure 2:
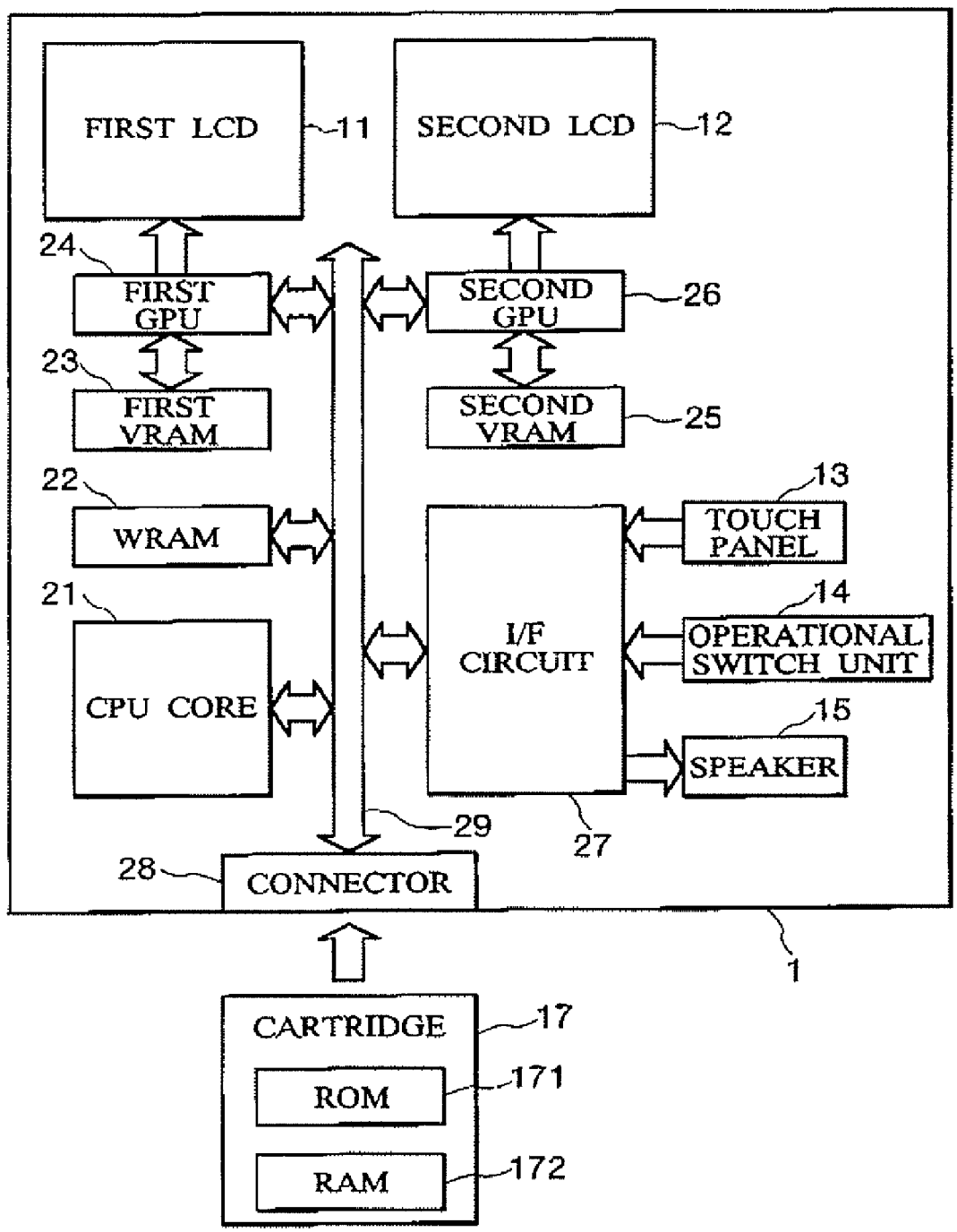
FIG. 2 is a block diagram showing the circuit configuration of the game machine according to an embodiment of the invention.

The circuit configuration of the game machine 1 will be described. FIG. 2 is a block diagram showing the circuit configuration of the game machine 1. In FIG. 2, a CPU core 21 is mounted on the electronic circuit board to be housed in the housing 18. The CPU core 21 is interfaced with a connector 28, an input/output interface (I/F) circuit 27, a first graphic processing unit (first GPU) 24, a second graphic processing unit (second GPU) 26, and a working RAM (WRAM) 22 via a bus 29.

The connector 28 is selectively connected with the cartridge 17. The connector 28 connects the CPU core 21 to the cartridge 17 via the bus 29. As mentioned above, the cartridge 17 is a storage medium storing a game program. Specifically, the cartridge 17 has a ROM 171 storing the game program and a RAM 172 which stores backup data in a rewritable manner. The game program stored in the ROM 171 of the cartridge 17 is loaded into the WRAM 22 to be executed by the CPU core 21. Temporary data acquired by the CPU core 21 executing the game program and data for generating images are stored in the WRAM 22. Recorded in the ROM 171 is the game program which is a set of commands executable by a computer (particularly, the CPU core 21) of the game machine 1, and a group of data to be used by the computer. The game program stored in the ROM 171 is loaded into the WRAM 22 whenever needed, and is executed by the CPU core 21. The term "computer" according to an aspect of the invention includes, but is not limited to, an electronic device capable of receiving data, processing the data according to predefined instructions and outputting a result. The term "computer" is not limited to an electronic device, or a central processing unit, but may include, for example, but not limited to, an array of processors that work together in executing an instruction set, or sets, by splitting a processing load in to sub-processes that are then executed by the array of processors, or any sub-grouping thereof as the skilled artisan will appreciate without departing from the scope and/or spirit of the invention.

The first GPU 24 is connected with a first video RAM (hereinafter "VRAM") 23. In accordance with an instruction from the CPU core 21, the first CPU 24 generates a first game image based on data for generating images to be stored in the WRAM 22, and writes the first game image in the first VRAM 23. The second GPU 26 is connected with a second VRAM 25. In accordance with an instruction from the CPU core 21, the second GPU 26 generates a second game image based on data for generating images to be stored in the WRAM 22, and writes the second game image in the second VRAM 25.

The first GPU 24 is connected to the first LCD 11. The first GPU 24 outputs the first game image, written in the first VRAM 23 according to an instruction from the CPU core 21, to the first LCD 11. The first LCD 11 displays the first game image output from the first CPU 24. The second GPU 26 is connected to the second LCD 12. The second GPU 26 outputs the second game image, written in the second VRAM 25 according to an instruction from the CPU core 21, to the second LCD 12. The second LCD 12 displays the second game image output from the second GPU 26.

The I/F circuit 27 is connected to the touch panel 13, the operational switch unit 14 and the speaker 15. The I/F circuit 27 passes data between external input/output devices (e.g., the touch panel 13, the operational switch unit 14, the speaker 15, etc.) and the CPU core 21. The speaker 15, disposed at a position inward of the sound hole, outputs sounds generated according to the game in play.

The touch panel 13 (including a device driver for the touch panel) has a coordinate system corresponding to the coordinate system of the second VRAM 25. The touch panel 13 outputs coordinate data corresponding to a position touched with the stick 16 to a predetermined register provided in the WRAM 22. When the resolution of the display screen of the second LCD 12 is, for example, 256 dots×192 dots, the detection accuracy of the touch panel 13 may also be 256 dots×192 dots corresponding to the display screen of the second LCD 12. The detection accuracy of the touch panel 13 may be lower or higher than the resolution of the display screen of the second LCD 12.

The following will describe an exemplary game of an embodiment which is played by the game machine 1 as shown in FIGS. 1 and 2. The game is a basketball game in which characters of a player team play against characters of an opponent team. When the player team is in the offense side, a character in the player team who actually has a ball normally becomes a player character who moves according to an instruction from the player. The player character may change according to the progress of the game.

The characters of the player team including the player character and the characters of the opponent team exist on a basketball game court (hereinafter simply called "court") formed in a virtual three-dimensional (3D) space, and move on the court according to the progress of the game. The ball is also present on the court formed in the virtual 3D space. The player team (or the opponent team) cart carry the ball on the court with the motion of the player character (or one of opponent characters) and put the ball in the goal of the opponent team (or the player team) to get a score.

The motions of other characters in the player team, other than the player character, are controlled by the CPU core 21 of the game machine 1 according to the movement of the ball or the player character. The motions of the characters of the opponent team are all controlled by the CPU core 21 of the game machine 1. When the player team is in the defense side, or the ball is in the neutral status (no character holds the ball), the player character is determined according to the position of the ball and the positions of the characters of the opponent team. Because the case where the player team is in the defense side, or the ball is in the neutral status is not directly relevant to the invention, the description of either case will be omitted.

Figure 3A:
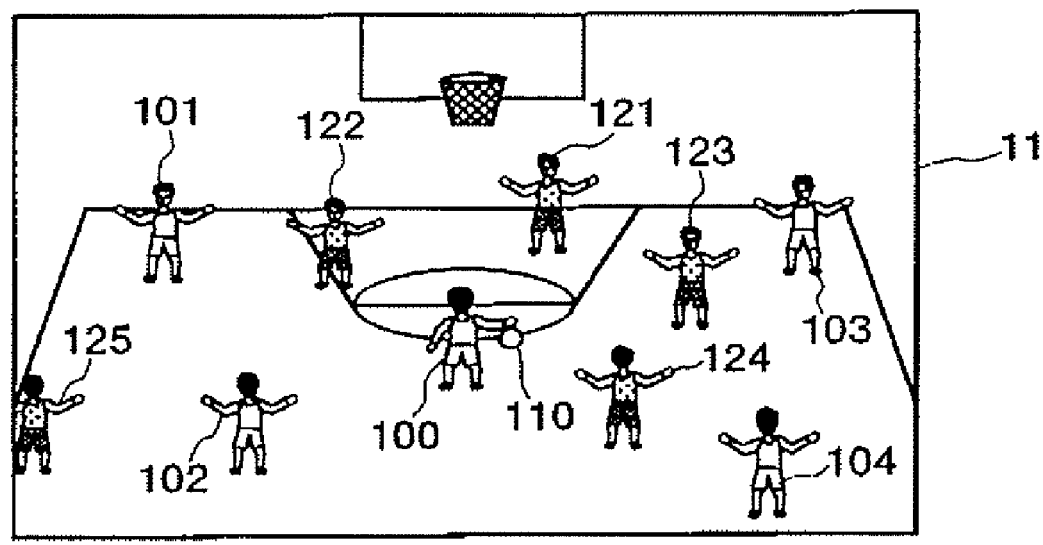
FIG. 3A is a diagram showing an example of a display screen which is displayed on a first LCD 11 in a basketball game according to an embodiment of the invention.
Figure 3B:
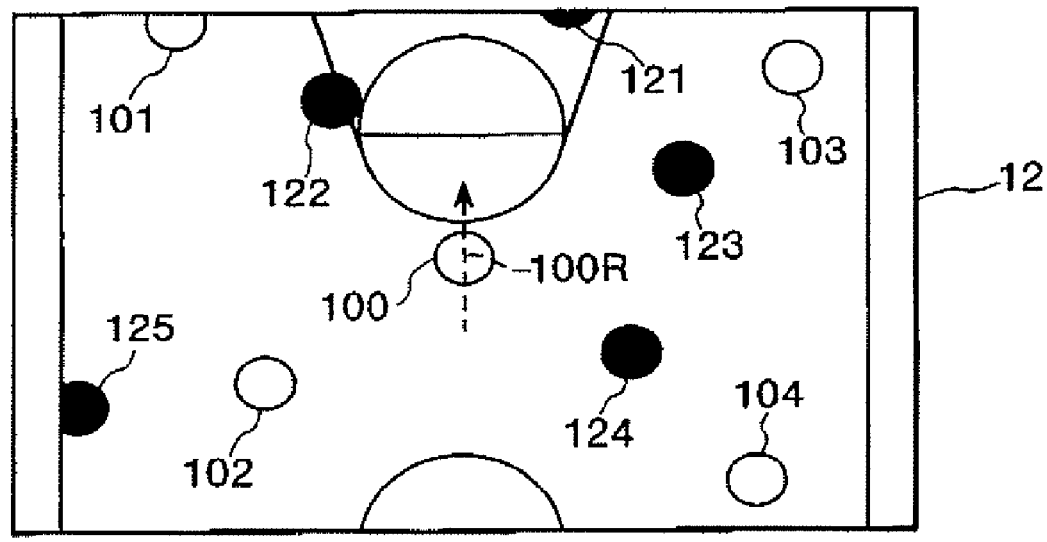
FIG. 3B is a diagram showing an example of a display screen which is displayed on a second LCD 12 in the basketball game according to an embodiment of the invention.

FIGS. 3A and 3B are diagrams showing examples of the display screen when the player team is in the offense side in the basketball game. As shown in FIG. 3A, the first LCD 11 displays an image which is obtained by the perspective transformation of the virtual 3D space, including the court, by a virtual camera whose view point is set at a predetermined position with a player character 100 holding a ball 110 (dribbling the ball 110 in this example) as a reference point. Of a plurality of characters disposed on the court, characters present in a perspective transformation range with the player character 100 as a reference are displayed on the first LCD 11. Those characters (characters 101 to 104 of the player team excluding the player character 100, and characters 121 to 125 of the opponent team), which are not present in the perspective transformation range with the player character 100 as a reference, are not displayed on the first LCD 11.

The position of a view point of the virtual camera is set to a position at a predetermined distance behind the player character 100 (the direction opposite to the direction of a route 100R or the reference direction of the player character 100) when the player character 100 stops moving and stand, for example, at the position illustrated in FIG. 3B on the court, or when a new player character 100 is set as a consequence of receiving a pass (if no obstacle is present between the view point and the player character 100).

As will be described later, the player character 100 may change the position of dribbling the ball 110 (the direction of the route 100R) according to an input from the touch panel 13. It is to be noted that a change in the direction of the player character 100 caused by changing the position at which the player character 100 dribbles the ball 110 according to an input from the touch panel 13 is smaller than a change in the position at which the player character 100 dribbles the ball 110. The position of the view point does not change unless the position of the player character 100 on the court changes, except for the case of a quick turn to be discussed later. When the player character 100 moves on the court according to an input from the direction indicating switch 14c, the position of the view point moves in response to the movement of the player character 100. In the case of quick turn to be discussed later, the position of the view point moves rearward of the player character 100 after making a turn.

As shown in FIG. 3B, the second LCD 12 displays an image of the x-z plane (plane perpendicular to the y direction or the height direction) of the virtual 3D space with the position of the player character 100 being the center. The range of the image to be displayed on the second LCD 12 is set to have the player character 100 in the center and make the direction of the view point of the virtual camera for displaying an image on the first LCD 11 downward. Because a line connecting the position of the view point and the player character 100 matches with the vertical direction of the court in FIG. 3B, the second LCD 12 has a display range as shown in FIG. 3B. Of the characters present in the display range of the second LCD 12, the positions of the characters (including the player character 100) 100 to 104 of the player team on the court are indicated by white circles. Of the characters present in the display range of the second LCD 12, the positions of the characters 121 to 125 of the opponent team on the court are indicated by black circles. However, any other shape and color combination may be used instead, as the skilled artisan will appreciate, without departing from the spirit and/or scope of the invention. For example, squares, rectangles, triangles, stars, or any other discernible pattern may be used instead of circles. The patterns are not limited to two dimensional patterns, but may include cubes, cylinders, pyramids, spheres, or any other three-dimensional pattern. Likewise, the colors of the discernible patterns is not limited to black and white, but may include any color, or combination thereof, in the visible light spectrum.

The vertical and horizontal directions of the display range of the second LCD 12 may not coincide with the vertical and horizontal directions of the court. When the vertical and horizontal directions of the display range of the second LCD 12 do not coincide with the vertical and horizontal directions of the court, the vertical and horizontal directions of the display range of the second LCD 12 are inclined to the vertical and horizontal directions of the court according to the direction of the line connecting the player character 100 as a reference point and the view point of the virtual camera. The input direction (a total of eight directions) of the direction indicating switch 14c corresponds to the display direction of the second LCD 12. The moving direction of the player character 100 on the court, when input through the direction indicating switch 14c, is determined according to the inclination angle of the court to the display range of the second LCD) 12.

A description will now be provided of the motion of the player character 100 when the player team is in the offense side in the basketball game. The motions of the player character 100 when the player team is in the offense side include dribbling of the ball 110 by the player character 100 stopped at an arbitrary position on the court, movement of the player character 100 on the court while dribbling the ball 110, passing the ball 110 to another character in the player team (in which case the character who has received the pass becomes a new player character 100), and shooting the ball 110.

A description will now be provided of a case where the player character 100 stops at an arbitrary position on the court and dribbles the ball 110. In this case, "the player character 100 stops on the court" means "it does not change its position on the court". When the player character 100 stops at an arbitrary position on the court, the player character 100 keeps dribbling the ball 110 according to motion data. The position of the ball 110, with respect to the position of the player character 100, is arbitrarily changed within a range where the hands of the player character 100 can reach according to the position input through the touch panel 13. The hand of the player character 100 dribbling the ball 110 is also changed according to the position input through the touch panel 13. Motion data for the player character 100 to dribble is changed according to the position input through the touch panel 13. As the motion data is changed, the position of the ball 110 and/or the hand of the player character 100 dribbling the ball 110 are changed.

As the player character 100 can dribble the ball 110 at an arbitrary position input through the touch panel 13, the amount of motion data becomes huge when motion data at the time the player character 100 dribbles the ball 110 is prepared for each position of the touch panel 13. To avoid such a huge amount of motion data, motion data is written in the ROM 171 in association with only specific coordinate positions on the touch panel 13 in the basketball game. When a coordinate position on the touch panel 13 for which motion data is not written in the ROM 171 is input, motion data for making the player character 100 dribble is obtained by blending motion data stored in the ROM 171 according to the coordinates of the input position.

FIGS. 4A to 4C are explanatory diagrams of motion blending when the player character 100 stops at an arbitrary position on the court and dribbles. The player character 100 can dribble the ball 110 with either the left hand or the right hand. FIGS. 4A to 4C illustrate blending of motion data when the player character 100 dribbles the ball 110 with the right hand. Blending of motion data when the player character 100 dribbles the ball 110 with the left hand should be understood from patterns obtained by inverting FIGS. 4A to 4C right side left.

As shown in FIG. 4A, the area on the touch panel 13 is separated into nine areas (1) to (9) of a 3×3 matrix equally. When the player character 100 dribbles the ball 110 with the right hand, the three areas (2), (5) and (8) in the center column (vertical direction) and the three areas (3), (6) and (9) in the right column are set as areas where the dribbling hand does not change (hatched areas in FIG. 4A). Specific coordinate positions 201, 203, 204 and 206 are respectively set for the positions of four corners of a rectangle formed by the six areas (2), (3), (5), (6), (8) and (9) where the player character 100 does not change the dribbling hand. Specific coordinate positions 202 and 205 are respectively set for the positions of the centers of the two vertical sides of the rectangle formed by the six areas ((2), (3), (5), (6), (8) and (9)) where the player character 100 does not change the dribbling hand.

Motion data corresponding to the respective positions of specific coordinate positions 201 to 206 are associated with the specific coordinate positions 201 to 206. If the input position on the touch panel 13 is any one of the specific coordinate positions 201 to 206 while the player character 100 is dribbling with the right hand, motion data associated with the specific coordinate position corresponding to the input position is loaded into the WRAM 22 and is directly used as motion data for making the player character 100 dribble. When a new player character 100 is set as a consequence of receiving a pass, motion data associated with the specific coordinate position 201 is loaded into the WHAM 22 and is used as default motion data for making the player character 100 dribble. The motion data associated with the specific coordinate position 201 makes the player character 100 dribble the ball 110 in front (i.e., in the direction of the route 100R).

When a position within the range of the areas (2), (3), (5), (6), (8) and (9), but other than the specific coordinate positions 201 to 206 is input, the coordinates of the input position are saved in the WRAM 22. At least latest two sets of coordinates of the input position on the touch panel 13 are saved. When a new player character 100 is set, all the coordinates saved in the WRAM 22 are erased and the specific coordinate position 201 associated with the motion data to be used as the default is saved in the WRAM 22 as the coordinates of the latest input position. The CPU core 21 blends motion data associated with the specific coordinate positions 201 to 206 to generate motion data in accordance with the coordinate positions saved in the WRAM 22.

A description will now be given of a case where, as shown in FIG. 4B, for example, a position, 210, T (x1, y1) in the area (3) is input. The y coordinate y1 of the position T is greater than the y coordinates 0 of the specific coordinate positions 201, 204 of the top corners, hut smaller than the y coordinates 95 of the specific coordinate positions 202, 205 of the center points. Four specific coordinate positions 201, 202, 204 and 205 are selected as specific coordinate positions whose associated motion data are to be blended. When a position one of whose x coordinate and y coordinate is the same as the corresponding coordinate of any of the specific coordinate positions 201 to 206, only two specific coordinate positions are selected as specific coordinate positions whose associated motion data are to be blended.

Let Th be the position of the intersection of a vertical line, which passes the position T and is parallel to the left side of the rectangle defined by the specific coordinate positions 201, 202, 204 and 205 (the side connecting the specific coordinate positions 201 and 202) and the right side of the rectangle (the side connecting the specific coordinate positions 204 and 205), and a horizontal top side of the rectangle defined by the specific coordinate positions 201, 202, 204 and 205 (the side connecting the specific coordinate positions 201 and 204). Let Tu be the position of the intersection of the vertical line, which passes the position T and is parallel to the left side and the right side of the rectangle defined by the specific coordinate positions 201, 202, 204 and 205, and a horizontal line of the bottom side of the rectangle defined by the specific coordinate positions 201, 202, 204 and 205 (the side connecting the specific coordinate positions 202 and 205). Let TI be the position of the intersection of a horizontal line, which passes the position T and is parallel to the top side and the bottom side of the rectangle defined by the specific coordinate positions 201, 202, 204 and 205, and a vertical line of the left side of the rectangle defined by the specific coordinate positions 201, 202, 204 and 205. Let Tr be the position of the intersection of the horizontal line, which passes the position T and is parallel to the top side and the bottom side of the rectangle defined by the specific coordinate positions 201, 202, 204 and 205, and a vertical line of the right side of the rectangle defined by the specific coordinate positions 201, 202, 204 and 205. Let H:U be the ratio of the length between the position T and the position Th to the length between the position T and the position Tu, Let L:R be the ratio of the length between the position T and the position TI to the length between the position T and the position Tr.

Blend ratios B(201), B(202), B(203), B(204) and B(205) are respectively acquired by equations shown in FIG. 4C. It is apparent from the equations shown in FIG. 4C that the blend ratio becomes higher for motion data whose associated specific coordinate position becomes closer to the input position T on the touch panel 13. The motion data corresponding to the specific coordinate position 201, 202, 204, 205 is blended with the acquired blend ratio B(201), B(202), B(204), B(205), thereby generating motion data for making the player character 100 dribble the ball 110. The generated motion data is saved in the WRAM 22.

When motion data corresponding to a position on the touch panel 13 newly input is blended and stored in the WRAM 22, old motion data before the position is input through the touch panel 13 is changed to the motion data corresponding to the newly input position (frame interpolation being involved in the motion data change) to cause the player character 100 to move accordingly. Depending on the relationship between the previous input position and the current input position, old motion data (for example, before the position is input through the touch panel 13) is temporarily changed to motion data for a link motion to cause the player character 100 to move accordingly, after which the link motion data is changed to the motion data corresponding to the newly input position to cause the player character 100 to move accordingly.

Figure 5A:
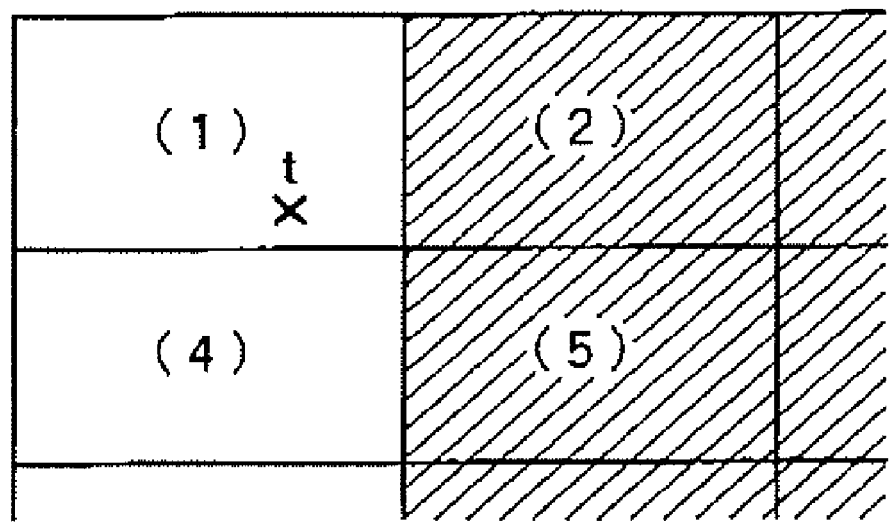
FIGS. 5A and 5B are explanatory diagrams for changing a hand of a player character dribbling.
Figure 5B:
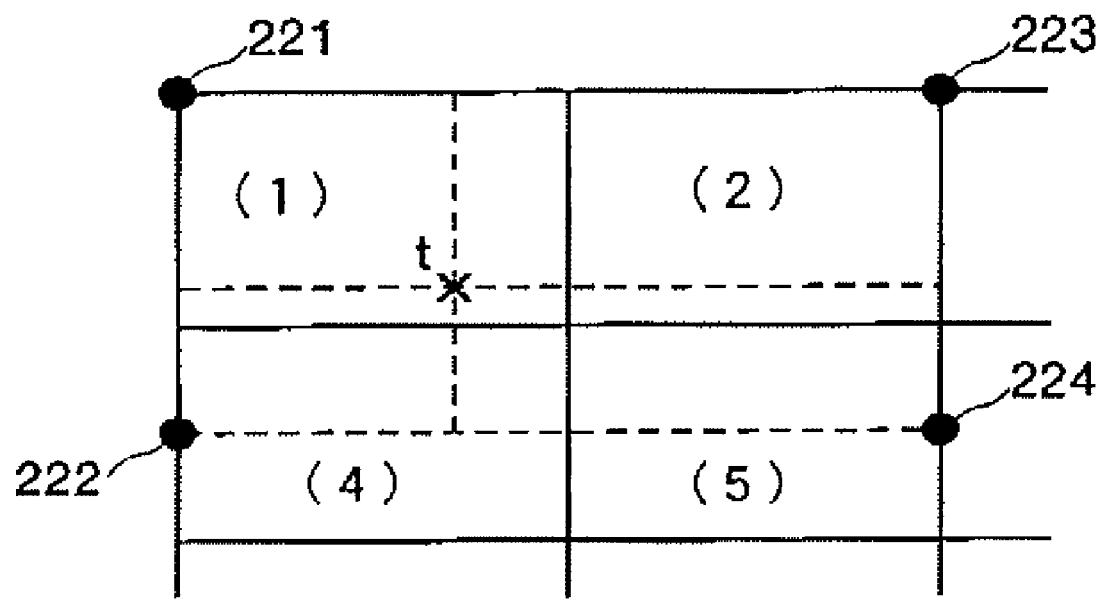

When a position in the range of the three areas (1), (4) and (7) on the left side of the touch panel 13 is input while the player character 100 is dribbling the ball 110 with the right hand, the hand of the player character 100 dribbling the ball 110 is switched to the left hand. FIGS. 5A and 5B are explanatory diagrams of a case where the hand of the player character 100 dribbling the ball 110 is switched from the right hand to the left hand. A case where the hand of the player character 100 dribbling the ball 110 is switched from the left hand to the right hand should be understood from patterns obtained by inverting FIGS. 5A and 5B right side left.

Suppose that as shown in FIG. 5A, a position t lying in the range of the area (1) on the touch panel 13 is input while the player character 100 is dribbling the hall 110 with the right hand, Because the position t lying in the range or the area (1) does not allow the player character 100 to dribble with the right hand, specific coordinate positions 221 to 224 corresponding to the input position t are selected from specific coordinate positions associated with dribbling with the left hand as specific coordinate positions whose associated motion data are to be blended, as shown in FIG. 5B. Motion data can be generated by the same scheme as the one illustrated in FIGS. 4B and 4C.

When the player character 100 switches the hand to dribble the ball 110, motion data is not directly changed from old motion data before the position is input through the touch panel 13 to motion data corresponding to the newly input position. When the player character 100 switches the hand to dribble the ball 110, motion data is temporarily changed to motion data for a link motion to make the player character 100 take a motion. After the player character 100 takes the motion according to the motion data for the link motion, the link motion data is changed to motion data corresponding to the newly input position to make the player character 100 take a motion accordingly.

Figures 6A, 6B:
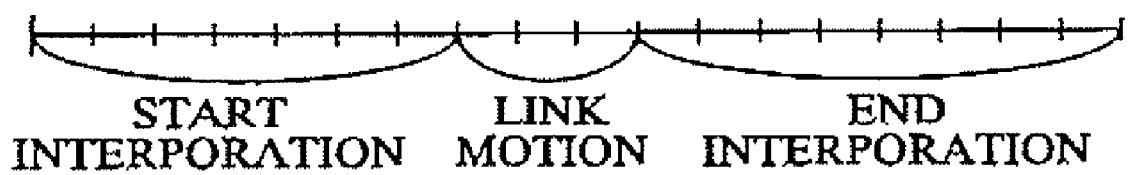
FIGS. 6A and 6B are explanatory diagrams for a link motion.

A link motion will be described below. FIGS. 6A and 6B are explanatory diagrams for a link motion. A link motion is always inserted when the player character 100 changes the hand dribbling the ball 110. Even when the player character 100 does not change the hand dribbling the ball 110, a link motion is inserted if the position previously input through the touch panel 13 lies in the areas (1) to (3) and the currently input position lies in the areas (7) to (9), or if the position previously input through the touch panel 13 lies in the areas (7) to (9) and the currently input position lies in the areas (1) to (3).

A link motion also makes the player character 100 take a motion as motion data is reproduced. For the link motion, different types of motion data are prepared according to the difference between the area where the previous position input through the touch panel 13 lies and the area where the currently input position lies, and are prestored in the ROM 171. As a link motion when the player character 100 was dribbling the ball 110 with the right hand before a new position is input through the touch panel 13, 26 types of link motions shown in FIG. 6A are prepared.

R(3) indicates that the player character 100 dribbles the ball 110 with the right hand based on the input of the position lying in the area (3). L(4) indicates that the player character 100 dribbles the ball 110 with the left hand based on the input of the position lying in the area (4). As a link motion when the player character 100 was dribbling the ball 110 with the left hand before a new position is input through the touch panel 13, 26 types of link motions which are inverted versions of the patterns shown in FIG. 6A are prepared.

A link motion of R(2)→L(1), for example, includes a motion for the player character 100 to switch the hand dribbling the ball 110 from the right hand to the left hand. A link motion of R(2)→R(8) includes a motion for the player character 100 to temporarily dribble at a middle position during transition from the motion for the player character 100 to dribble at a position corresponding to the area (2) to the motion for the player character 100 to dribble at a position corresponding to the area (8).

When a link motion is inserted, the player character 100 is made to take a motion based on the position currently input through the touch panel 13 changed from the position previously input through the touch panel 13 with the motion data of the link motion in between, As shown in FIG. 6B, during the transition from the motion data generated based on the position previously input through the touch panel 13 to the motion data of the link motion, frame interpolation (start interpolation) is performed by a predetermined number of frames. During the transition from the motion data of the link motion to the motion data generated based on the position currently input through the touch panel 13, frame interpolation (end interpolation) is likewise performed by a predetermined number of frames.

An example where the player character 100 moves on the court dribbling the ball 110 will be described. The language, "the player character 100 moves on the court" means that the player character 100 changes its position on the court. An instruction to move the player character 100 on the court is input according to the player's manipulation of the direction indicating switch 14c. The player character 100 moves, while dribbling the ball 110, in the direction input from the direction indicating switch 14c. For the motion of the player character 100 moving on the court, motion data is prepared in advance and prestored in the ROM 117, and is blended with the link motion of the dribbling motion.

Figure 7A:
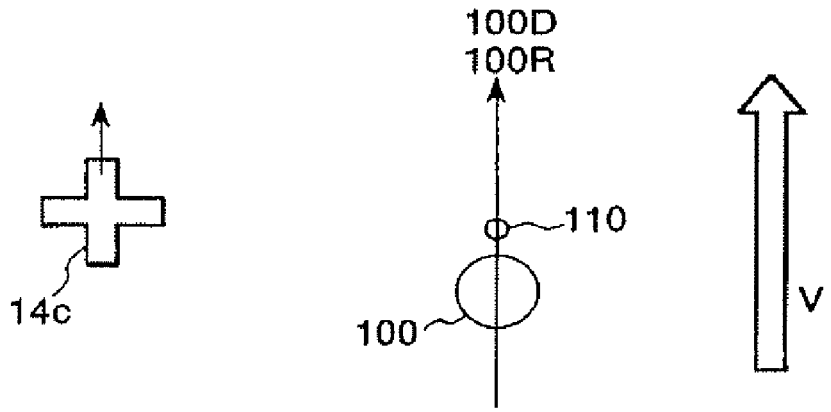
FIGS. 7A to 7C are explanatory diagrams showing the relationship between a position where a ball is dribbled and the moving speed of a player character.
Figure 7B:
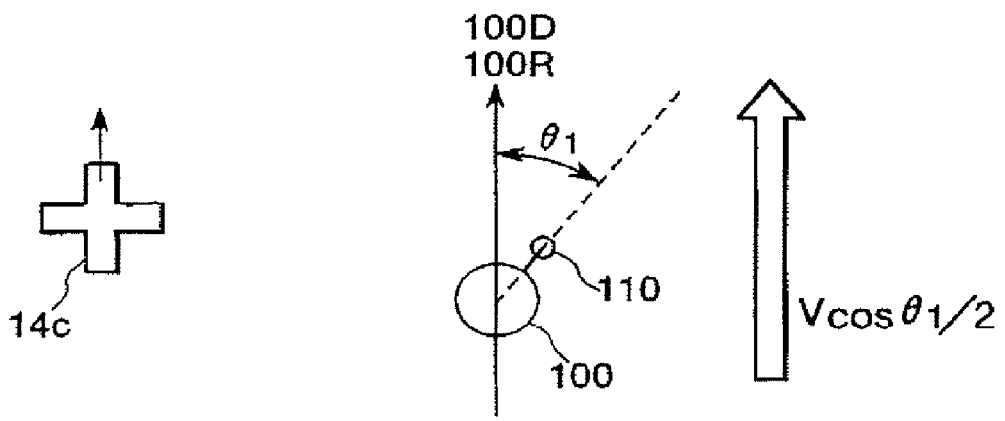
Figure 7C:
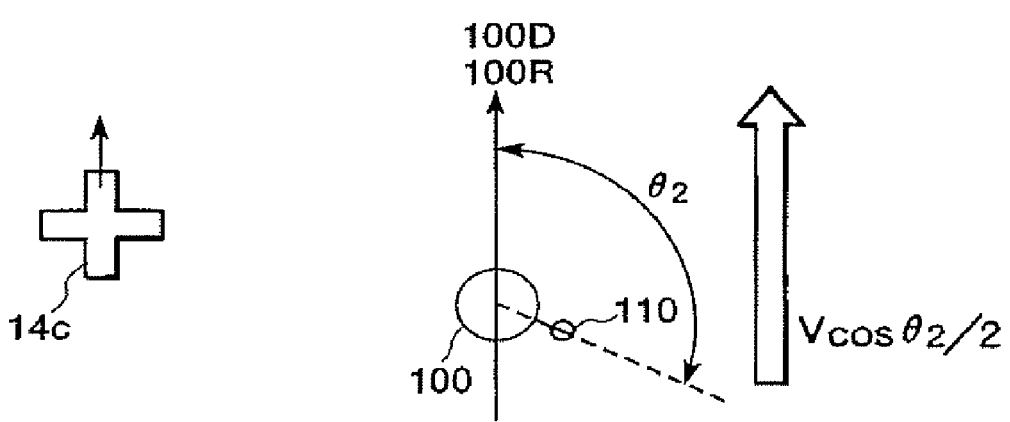

In the exemplary basketball game, the moving speed (velocity) of the player character 100 changes according to the position of the ball 110 which the player character 100 dribbles FIGS. 7A to 7C are explanatory diagrams showing the relationship between the position of the ball 100 which the player character 100 dribbles and the moving speed of the player character 100. Tn FIGS. 7A to 7C, route direction 100R of the player character 100 has already been in the direction input from the direction indicating switch 14c. In FIGS. 7A to 7C, the player character 100 moves in the direction input from the direction indicating switch 14c (moving direction 100D).

When the ball 110 is present in the moving direction 100D of the player character 100 (when the direction from the player character 100 to the ball 110 matches with the moving direction 100D), as shown in FIG. 7A, the player character 100 moves on the court at a speed V. When the player character 100 moves on the court at the speed V, the player character 100 is moved by reproducing motion data for the movement at a normal speed.

When the angle between the direction from the player character 100 to the ball 110 and the moving direction 100D is $\theta 1$, as shown in FIG. 7B, the player character 100 moves at a speed $V \cos(\theta 1/2)$. When the angle between the direction from the player character 100 to the ball 110 and the moving direction 100D is $\theta 1$ the moving speed is slower than the speed V when the ball 110 lies in the moving direction 100D.

When the angle between the direction from the player character 100 to the ball 110 and the moving direction 100D is $\theta 2$, which is greater than $\theta 1$, as shown in FIG. 7C, the player character 100 moves at a speed $V \cos(\theta 2/2)$. When the angle between the direction from the player character 100 to the ball 110 and the moving direction 100D is $\theta 2$, the moving speed is slower than the speed $V \cos(\theta 1/2)$ when the angle between the direction from the player character 100 to the ball 110 and the moving direction 100D is $\theta 1$. When the angle between the direction from the player character 100 to the ball 110 and the moving direction 100D is $\theta 1$ or $\theta 2$, not only the moving speed of the player character 100 is controlled, but also the reproduction speed of motion data becomes $\cos(\theta 1/2)$ times or $\cos(\theta 2/2)$ times the normal reproduction speed according to the moving speed, slower than the reproduction speed when the player character 100 moves at the speed V.

When the player character 100 moves on the court, the route direction 100R should be in an advancing direction. If the direction input from the direction indicating switch 14c does not match with the route direction 110R, the route direction 100R is changed, after which the player character 100 moves on the court. In changing the route direction 100R, when the ball 110 has already lied within a predetermined range from the direction input from the direction indicating switch 14c, the route direction 100R of the player character 100 is changed by a scheme called quick turn.

Figure 8A:
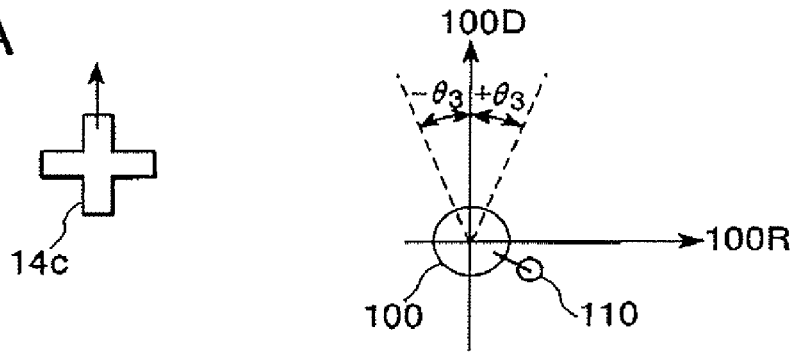
FIGS. 8A and 8B are explanatory diagrams of a normal turn.
Figure 8B:
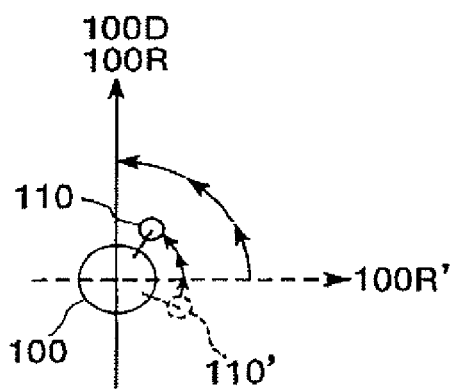
Figure 8C:
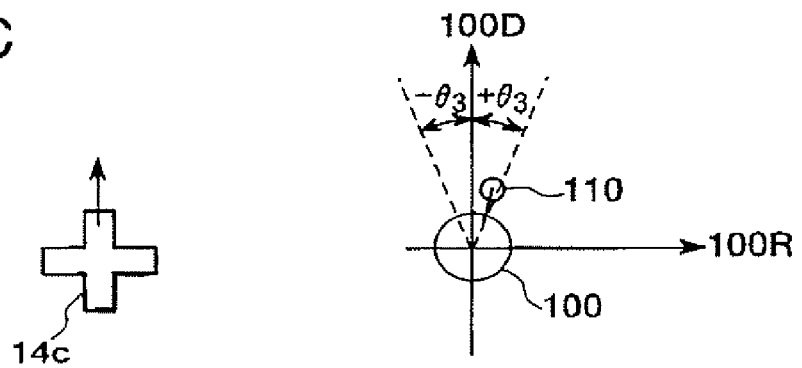
FIGS. 8C and 8D are explanatory diagrams of a quick turn.
Figure 8D:
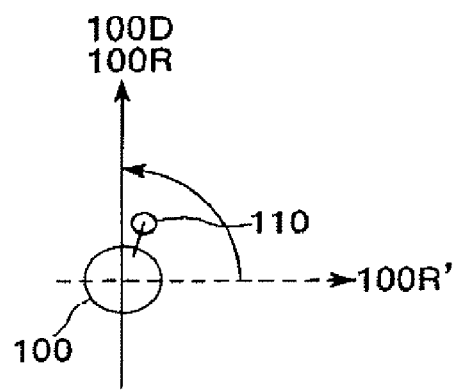

FIGS. 8A and 8B are explanatory diagrams of a normal turn. The normal turn is taken when the ball 110 does not lie within a predetermined range from the direction input from the direction indicating switch 14c. FIGS. 8C and 8D are explanatory diagrams of a quick turn. The quick turn is taken when the ball 110 lies within the predetermined range from the direction input from the direction indicating switch 14c.

Referring to FIGS. 8A to 8D, a case where an upward input is made through the direction indicating switch 14c with the route direction 100R being in the right direction.

FIG. 8B shows a case where the ball 110 is present outside the range of +/−$\theta 3$ from the moving direction 100D when an upward input is made through the direction indicating switch 14c with the route direction 100D being in the right direction as shown in FIG. 8A. As shown in FIG. 8B, the player character 100 turns while dribbling the ball 110 until the direction of the route 100R matches with the moving direction 100D. Motion data for turning is prestored in the ROM 117, and is blended with motion data for dribbling and reproduced. At least a period of ten and some frames, which differs depending on the original position of the ball 1107 is needed for the route direction 100R to face the moving direction 100D.

FIG. 8D shows a case where the ball 110 is present in the range of +/−θ3 from the moving direction 100D when an upward input is made through the direction indicating switch 14c with the route direction 100R being in the right direction as shown in FIG. 8C. As shown in FIG. 8D, the player character 100 immediately changes the route direction 100R to the moving direction 100D. Frame interpolation for several frames may be performed in making a turn.

When an input from the direction indicating switch 14c and an input from the touch panel 13 are made simultaneously, the player character 100 changes the hand and/or the position to dribble the ball 110 according to the input from the touch panel 13, then moves on the court dribbling the ball 110 according to the input from the direction indicating switch 14c. The motion of the player character 100, when an input from the direction indicating switch 14c and an input from the touch panel 13 are made simultaneously, can be realized by combining processes for those motions. (It is to be noted, however, that there is a case where motion data exists that is different from the one when the player character 100 stops and dribbles or the one when the player character 100 dribbles while moving.) Because a pass motion and a shoot motion of the player character 100 are not directly relevant to the invention, their descriptions will be omitted.

The following will describe a process for playing the basketball game with the game machine 1 shown in FIGS. 1 and 2. A character on an opponent team may hold the ball during the progress of a game. Then, when the player team is in the offense side, a character different from the current player character may receive the ball, which is passed from the player character. In this case, the character which received the ball becomes a new player character. The following description will be provided only for a process relevant to the invention (process for moving the player character actually holding the ball).

Figure 9:
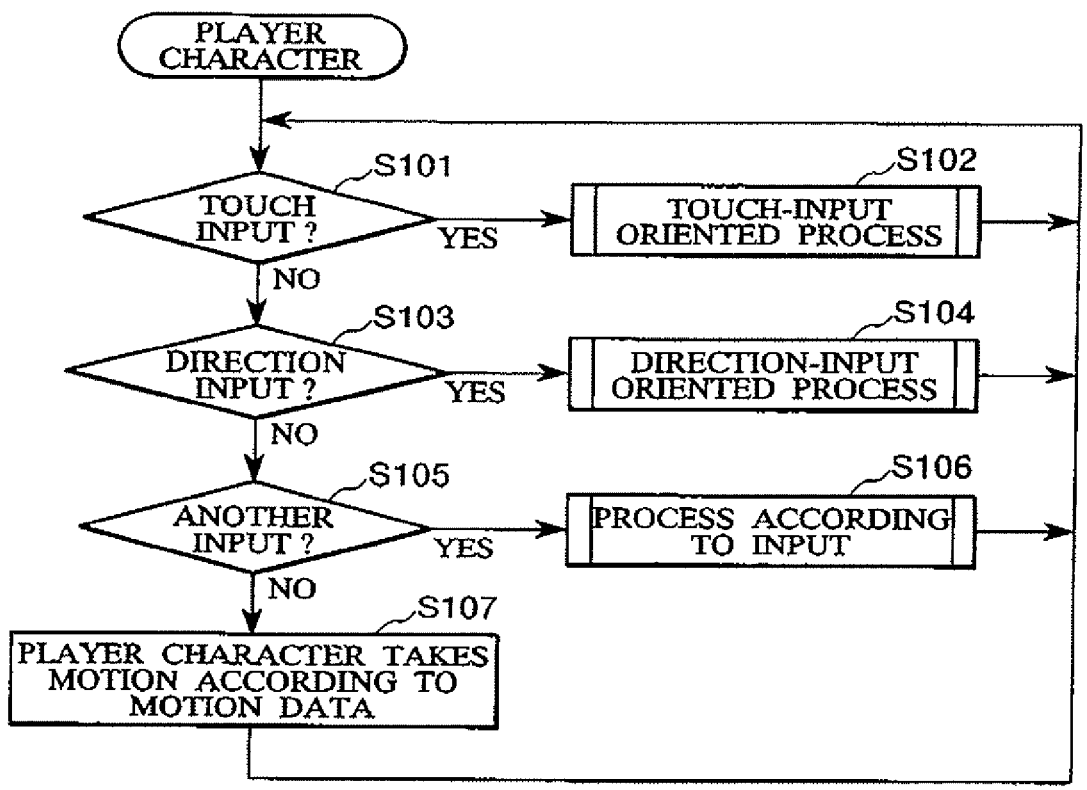
FIG. 9 is a flowchart illustrating a process for moving a player character when a player team is in the offense side in a basketball game according to an embodiment of the invention.

FIG. 9 is a flowchart illustrating a process for moving the player character 100 when the player team is in the offense side in the basketball game. The process shown in FIG. 9 is for the CPU core 21 to execute a game program loaded from the ROM 171 in cartridge 17. When the process shown in FIG. 9 starts for the first time, the specific coordinate position 201 is set as a default, and the player character 100 dribbling the ball 110 with the right hand is set as a default.

The CPU core 21 determines whether any coordinate position on the touch panel 13 is input (step S101). When a coordinate position is input through the touch panel 13, the CPU core 21 performs a touch-input oriented process which will be described in detail (step S102) with respect to FIG. 10. After the touch-input oriented process, the process returns to step S101. When no coordinate position is input through the touch panel 13, the CPU core 21 determines whether any direction is input from the direction indicating switch 14c (step 5103). When any direction is input from the direction indicating switch 14c, the CPU core 21 performs a direction-input oriented process which will be described in detail (step S104) with respect to FIG. 11. After the direction-input oriented process, the process returns to step S101.

When no direction is input from the direction indicating switch 14c, the CPU core 21 determines whether another input is made through the operational switch unit 14 (step S105). When another input is made through the operational switch unit 14 the CPU core 21 performs a process according to the input, as the skilled artisan will readily appreciate, such as, for example, causing the player character 100 to shoot or to pass the ball to another character, or some other control command from the player (stop S106). After the process according to the input finishes, the process returns to step S101. When no other input is made in step S105, the CPU core 21 causes the player character 100 take a motion according to the latest motion data stored in the WRAM 22 (step S107). Then, the process returns to step S101.

Figure 10:
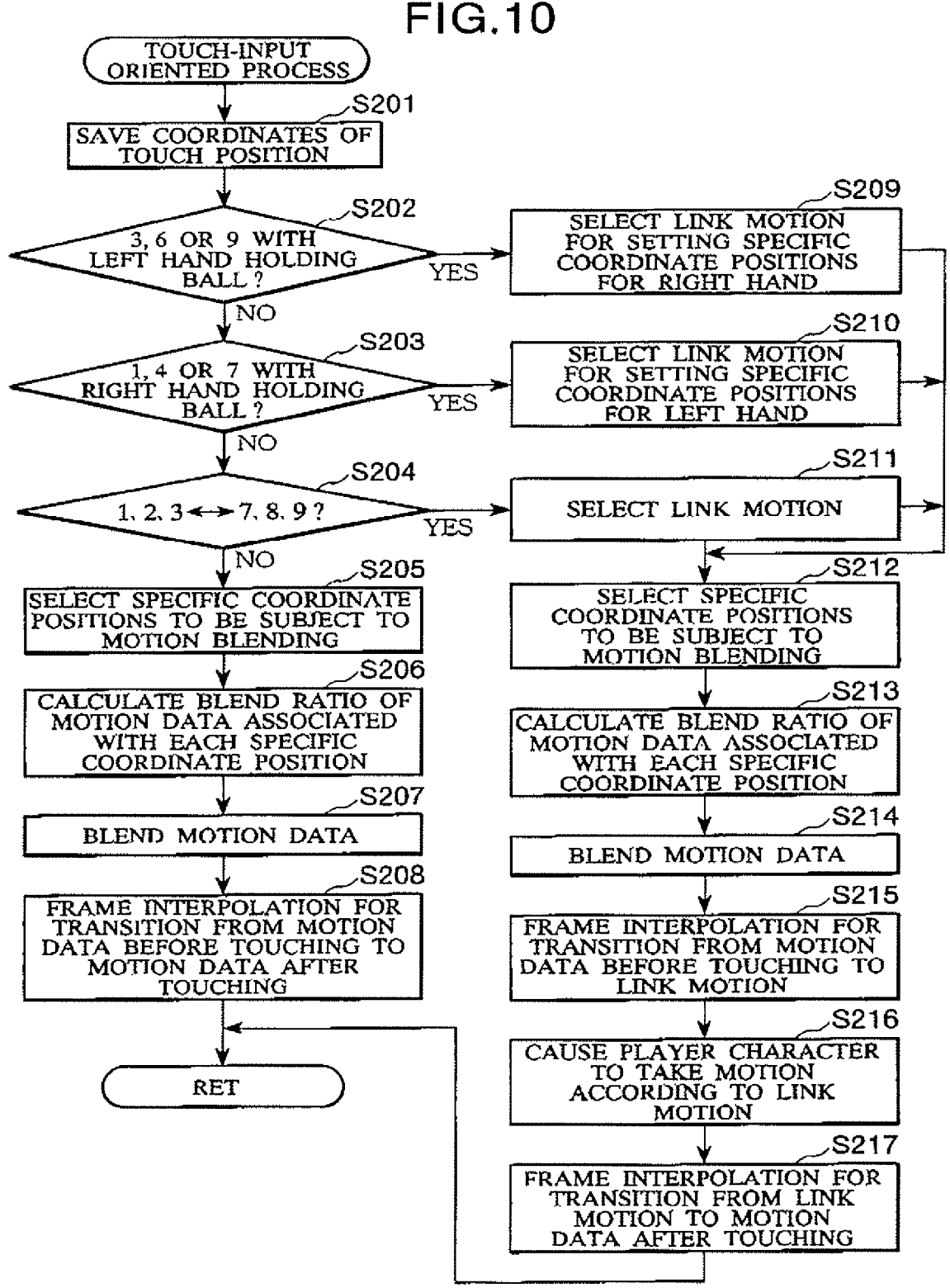
FIG. 10 is a detailed flowchart illustrating a touch-input oriented process in FIG. 9.

FIG. 10 is a detailed flowchart illustrating the touch-input oriented process executed by step S102 of FIG. 9. In the touch-input oriented process, the CPU core 21 saves the coordinates of the position input through the touch panel 13 in the WRAM 22 (step S201). The CPU core 21 determines whether the player character 100 is currently dribbling the ball 110 with the left hand and whether the position input through the touch panel 13 lies in any of the areas (3), (6) and (9) (step S202).

When the player character 100 is dribbling the ball 110 with the right hand, or the position input through the touch panel 13 lies outside the areas (3), (6) and (9) ("No" in step S202), the CPU core 21 determines whether the player character 100 is dribbling the ball 110 with the right hand and whether the position input through the touch panel 13 lies in any of the areas (1), (4) and (7) (step S203).

When the player character 100 is dribbling the ball 110 with the left hand, or the position input through the touch panel 13 lies outside the areas (1), (4) and (7) ("No" in step S203), the CPU core 21 determines whether the position input through the touch panel 13 previously stored in the WRAM 22 (including a position stored as a default) lies in any of the areas (1) to (3) and the currently input position lies in any of the areas (7) to (9), or the position input through the touch panel 13 previously stored in the WRAM 22 lies in any of the areas (7) to (9) and the currently input position lies in any of the areas (1) to (3) (step S204).

When the input position previously stored in the WRAM 22 or the currently input position lies in any of the areas (4) to (6), or the position input through the touch panel 13 previously stored in the WRAM 22 lies in any of the areas (7) to (9) and the currently input position lies in any of the areas (7) to (9), or the position input through the touch panel 13 previously stored in the WRAM 22 lies in any of the areas (1) to (3) and the currently input position lies in any of the areas (1) to (3) ("No" in step S204), the CPU core 21 selects specific coordinate positions whose motion data are to be blended according to the position currently input through the touch panel 13 (step S205).

The CPU core 21 calculates the blend ratios for motion data associated with the selected specific coordinate positions according to the respective specific coordinate positions and the currently input coordinate position (step S206). The CPU core 21 blends motion data associated with the selected specific coordinate positions by the respective blend ratios calculated to generate motion data for the player character and store it in the WRAM 22 (step S207).

The CPU core 21 performs frame interpolation by a predetermined number of frames for the transition from motion data applied before the current position is input through the touch panel 13 to motion data generated according to the new position input through the touch panel 13 (step S208). After the process in step S208, the touch-input oriented process ends, and then the process returns to the to the process illustrated as the flowchart in FIG. 9. If no input is made after the process returns to the flowchart in FIG. 9, the player character 100 is made to take a motion according to the motion data generated in step S207.

When the player character 100 is dribbling the ball 110 with the left hand and the position input through the touch panel 13 lies in any of the areas (3), (6) and (9) ("Yes" in step S202), the CPU core 21 sets specific coordinate positions for the right hand dribble, and stores the set specific coordinate positions in the WRAM 22. The CPU core 21 selects motion data for a link motion according to an area including the position previously stored in the WRAM 22 and an area including the currently input position (step S209). The process then advances to step S212.

When the player character 100 is dribbling the ball 110 with the right hand and the position input through the touch panel 13 lies in any of the areas (1), (4) and (7) ("Yes" in step S203), the CPU core 21 sets specific coordinate positions for the left hand dribble, and stores the set specific coordinate positions in the WRAM 22. The CPU core 21 selects motion data for a link motion according to an area including the position previously stored in the WRAM 22 and an area including the currently input position (step S210). The process then advances to step S212.

When the position input through the touch panel 13 previously stored in the WRAM 22 lies in any of the areas (1) to (3) and the currently input position lies in any of the areas (7) to (9), or the position input through the touch panel 13 previously stored in the WRAM 22 lies in any of the areas (7) to (9) and the currently input position lies in any of the areas (1) to (3) ("Yes" in step S204), the CPU core 21 selects motion data for a link motion according to an area including the position previously stored in the WRAM 22 and an area including the currently input position (step S211). The process then advances to step S212.

The processes of steps S212 to S214 are identical to the processes of steps S205 to S207, respectively. After step S214 ends, the CPU core 21 performs frame interpolation by a predetermined number of frames for the transition from motion data applied before the current position is input through the touch panel 13 to motion data for the link motion selected in steps S209 to S211 (step S215). The player character 100 is made to take a motion according to the motion data for the link motion selected in steps S209 to S211 (step S216).

The CPU core 21 performs frame interpolation by a predetermined number of frames for the transition from the motion data for the link motion to motion data generated according to the position newly input through the touch panel 13 (step S217). After the process in step S217 finishes, the touch-input oriented process ends, and then the process returns to the exemplary process illustrated as the flowchart in FIG. 9. If no input is made, the player character 100 is caused to move in accordance with the motion data generated in the steps S207 or S214.

Figure 11:
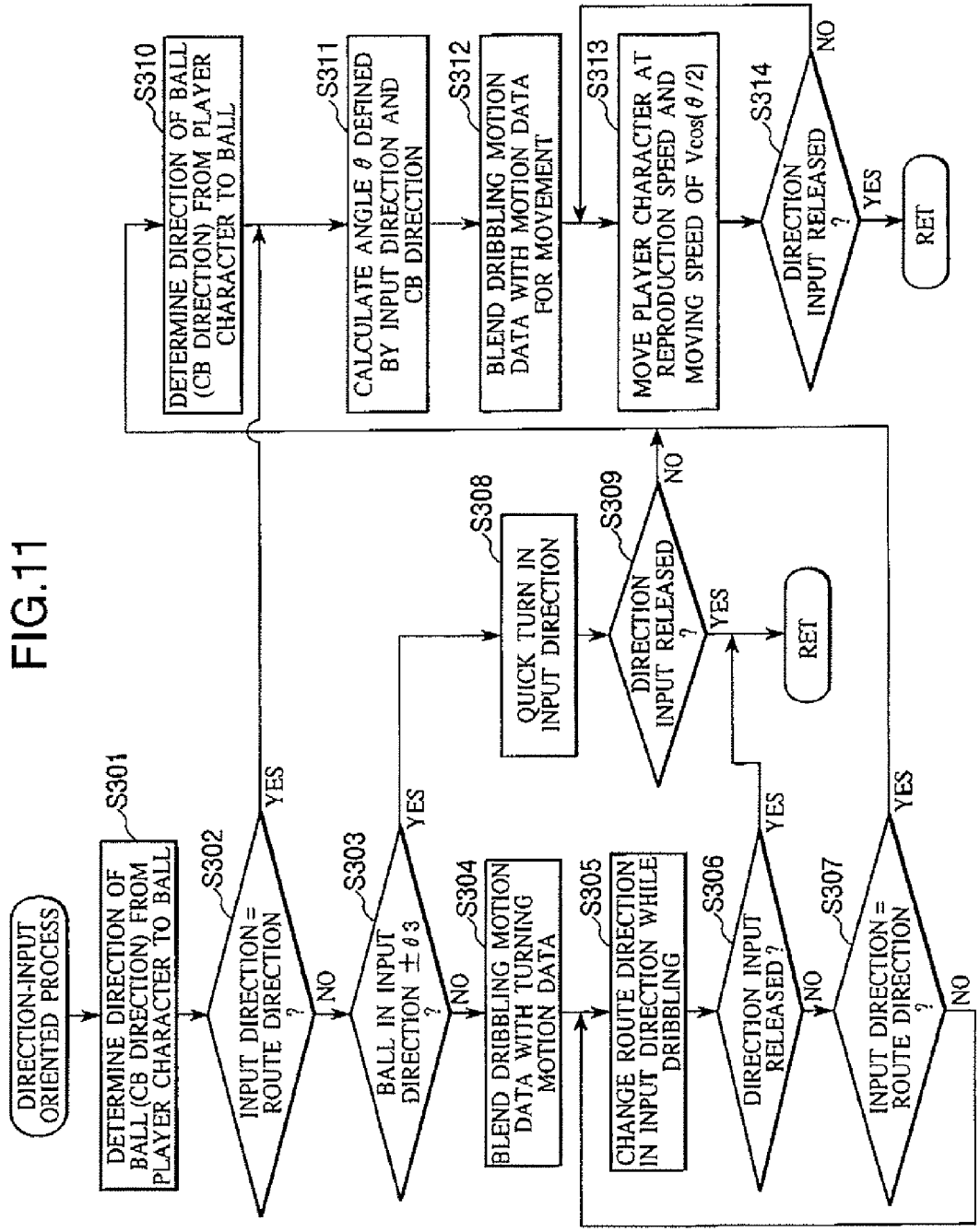
FIG. 11 is a detailed flowchart illustrating a direction-input oriented process in FIG. 9.

FIG. 11 is a detailed flowchart illustrating the direction-input oriented process executed by step S104 of FIG. 9. In the process of the flowchart illustrated in FIG. 11, when comparing the directions from the player character 100 toward the ball 110 or the route direction 100R with the direction input from the direction indicating switch 14c, the CPU core 21 transforms the direction input from the direction indicating switch 14c according to the direction toward the player character 100, which is a reference point, from the view point of the virtual camera. The input direction in the following description indicates a direction after transformation.

In the direction-input oriented process, the CPU core 21 determines the direction toward the position of the ball 110 from the position of the player character 100 on the court (step S301). The CPU core 21 determines whether the direction input from the direction indicating switch 14c matches with the route direction 100R of the player character 100 (step S302). When the input direction matches with the route direction 100R ("Yes" in step S302), the CPU core 21 can move the player character 100 on the court with the route direction 100R unchanged, the process advances to step S311.

When the input direction does not match with the route direction 100R ("No" in step S302), the CPU core 21 needs to change the route direction 100R to match the input direction before moving the player character 100. The CPU core 21 determines whether the ball 110 lies in an area within the range of +/−θ3 from the direction input from the direction indicating switch 14c (step S303).

If the ball 110 does not lie in the area within the range of +/−θ3 ("No" in step S303), the CPU core 21 cannot make the player character 100 turn by a quick turn. When the ball 110 does not lie in the area within the range of +/−θ3, the CPU core 21 blends motion data for the player character 100 to take a dribbling motion (which can be the one currently stored in the WRAM 22 or exclusive motion data for the case where the ball 110 does not lie in the area within the range of +/−θ3) with turning motion data stored in the ROM 117, thereby generating turning motion data (step S304).

The CPU core 21 changes the route direction 100R by every predetermined angle toward the direction input from the direction indicating switch 14c while making the player character 100 dribble the ball 110 (step S305). The CPU core 21 then determines whether inputting of the direction from the direction indicating switch 14c is released (step S306). When inputting of the direction from the direction indicating switch 14c is released ("Yes" in step S306), the direction-input oriented process is terminated, and the process returns to the to the process illustrated by the flowchart in FIG. 9.

When inputting of the direction from the direction indicating switch 14c is not released ("No" in step S306), the CPU core 21 determines whether the route direction 100R of the player character 100 matches the direction input from the direction indicating switch 14c (step S307). When the route direction 100R does not match the input direction ("No" in step S307), the process returns to step S305. The CPU core 21 keeps changing the direction of the player character 100. When the route direction 100R matches with the input direction ("Yes" in step S307), the CPU core 21 can move the player character 100 on the court. The process advances to step S310.

When the ball 110 lies in the area within the range of +/−θ3 from the input direction ("Yes" in step S303), the CPU core 21 spontaneously changes the route direction 100R of the player character 100 to the direction input from the direction indicating switch 14c (i.e., quick turn) (step S308). The CPU core 21 determines whether inputting of the direction from the direction indicating switch 14c is released (step S309). When inputting of the direction from the direction indicating switch 14c is released ("Yes" in step S309), the direction-input oriented process is terminated, and the process returns to the process depicted by the flowchart in FIG. 9. When inputting of the direction from the direction indicating switch 14c is not released ("No" in step S309), the route direction 100R matches with the input direction by the quick turn taken in step S308. The CPU core 21 can move the player character 100 on the court. The process then advances to step S310.

In step S310, the CPU core 21 again determines the direction toward the position of the ball 110 from the position of the player character 100 on the court. One of the reasons why the CPU core 21 determines the direction toward the position of the ball 110 from the position of the player character 100 on the court again is that when the player character 100 changes the route direction 100R while dribbling the ball 110, the direction is different from the direction toward the position of the ball 110 from the position of the player character 100 determined in step S301. The process then advances to step S311.

In step S311, the CPU core 21 calculates the angle θ defined by the direction toward the position of the ball 110 from the position of the player character 100 determined in step S301 or S310 and the direction input from the direction indicating switch 14c, The CPU core 21 blends motion data for making the player character 100 dribble the ball 110 with motion data for movement stored in the ROM 117 to generate motion data for movement on the court (step S312).

The CPU core 21 reproduces the motion data generated in step S312 at a speed cos(θ/2) times than the normal speed and moves the player character 100 on the court in the direction input from the direction indicating switch 14c at the moving speed of V cos(θ/2) (step S313).

The CPU core 21 determines whether inputting of the direction from the direction indicating switch 14c is released (step S314). When inputting of the direction from the direction indicating switch 14c is not released ("No" in step S314), the process returns to step S313. When inputting of the direction from the direction indicating switch 14c is released ("Yes" in step S314), the direction-input oriented process is terminated, and the process returns to the exemplary process illustrated in the flowchart in FIG. 9.

According to the above-described processes shown in FIGS. 9, 10 and 11, the player character 100 moves on the court formed in virtual 3D space. The characters 101 to 104, and 121 to 125, other than the player character 100, move on the court in the virtual 3D space under control of the CPU core 21. The ball 110 also moves on the court in virtual 3D space in accordance with motions of the player character 100 and the other characters 101 to 104, and 121 to 125. The motions of the player character 100 and the other characters 101 to 104, and 121 to 125 progress the basketball game.

The way how the game progresses is displayed as images on the first LCD 11 and the second LCD 12. Generation of the images displayed on the first LCD 11 and the second LCD 12 is carried out as follows.

In order to generate an image to be displayed on the first LCD 11, the CPU core 21 sets the position of the view point of the virtual camera in accordance with the motion of the player character 100 or the change thereof to a new player character 100. The CPU core 21 sets the reference point of the virtual camera at the position of the player character 100. The CPU core 21 transforms each vertex of polygons which constitute objects (including the player character 100, the other characters 101 to 104, and 121 to 125, and the ball 110) included in a range subject to perspective transformation in the virtual 3D space into coordinates of a viewpoint coordinate system.

The CPU core 21 sends the coordinates for each vertex transformed to the viewpoint coordinate system to the first GPU 24, and outputs a write instruction to the first CPU 24. The first GPU 24, which has received the write instruction, develops image data in the first VRAM 23 in such a way that each polygon is written based on the coordinates of the viewpoint coordinate system sent from the CPU core 21 by a z-buffer method. When developing the data, processes, such as, for example, a hidden-surface removing process, a shading, and a texture mapping are executed, as well as any other processes that the skilled artisan would deem appropriate without departing from the spirit and/or scope of the invention.

The first CPU 24 sequentially reads out image data developed in the first VRAM 23, generates a video signal by adding synchronization signals to the image data, and outputs the video signal to the first LCD 11. The first LCD 11 displays an image corresponding to the video signal output from the first GPU 24. As the image displayed on the first LCD 11 is changed every frame period, the player can view the three-dimensional images showing how the player character 100 and the other characters 101 to 104, and 121 to 125 play the basketball game on the court formed in virtual 3D space.

The CPU core 21 sets the position of the player character 100 at the coordinates of the central position in the second LCD 12 to generate an image to be displayed on the second LCD 12. The CPU core 21 transforms the coordinates of the other characters 101 to 104, and 121 to 125 in the x-z plane in virtual 3D space into coordinates of a coordinate system which sets the direction from the viewpoint of the virtual camera toward the player character 100 to the y-axis direction.

The CPU core 21 sends the transformed coordinates of the player character 100 and the other characters 101 to 104, and 121 to 125 to the second GPU 26, and outputs a write instruction to the second GPU 26. The second GPU 26, which has received the write instruction, develops marks according to the kinds of the characters 100 to 104, and 121 to 125 in the second VRAM 25 in accordance with the coordinate position of each of the characters 100 to 104, and 121 to 125.

The second GPU 26 sequentially reads out image data developed in the second VRAM 25, generates a video signal by adding synchronization signals to the image data, and outputs the video signal to the second LCD 12. The second LCD 12 displays an image corresponding to the video signal output from the second CPU 26. As the image displayed on the second LCD 12 is changed every frame period, the player can view a two-dimensional image that indicates the position of each of the characters 101 to 104, and 121 to 125 that is present on the court, with the player character 100 being the center.

As explained above, in the basketball game according to the embodiment, in a case where the player team is in the offense side and there is no input from the operation switch unit 14, the player character 100 keeps dribbling the ball 110 without changing the position on the court formed in the virtual 3D space. The image of the dribbling action of the player character 100, without changing the position in a case where the player team is in the offense side and there is no input from the operation switch unit 14, is reproduced using motion data, and displayed on the first LCD 11. The position where the player character 100 dribbles the ball 110 is changed in accordance with a position input through the touch panel 13. As the position where the player character 100 dribbles the ball 110 changes, motion data necessary for reproducing the motion of player character 100 changes.

Motion data for making the player character 100 dribble the ball 110 is prepared beforehand only for the specific coordinate positions 201 to 206, and 221 to 224 which are set over the touch panel 13. In a case where a position other than the specific coordinate positions 201 to 206, and 221 to 224 in the touch panel 13 is input, the motion data for making the player character 100 dribble the ball 110 is generated by calculating the blend ratios for motion data associated with the respective specific coordinate positions 201 to 206, and 221 to 224 in accordance with the positional relationships between the input position and the specific coordinate positions 201 to 206, and 221 to 224, and blending the motion data by the blend ratios.

As the motion data associated with the respective specific coordinate positions 201 to 206, and 221 to 224 can be blended by different blend ratios according to the position input through the tough panel 13, the motion data differs in accordance with the position input through the touch panel 13. A delicate difference can be expressed as the dribble motion of the player character 100 in accordance with the difference in the positions input through the touch panel 13, and this enables representation of the motion of the player character 100 to mimic real world motion of a basketball player.

The player character 100 is motioned with motion data differing in accordance with the difference in the positions input through the touch panel 13, the position where the player character 100 dribbles the ball 110 can be changed freely by only changing the position input through the touch panel 13. The player can input an instruction on which position the player character 100 dribbles the ball 110 with an intuitive determination on what coordinate position to be input is taken.

In a case where there is an input through the touch panel 13 white the player character 100 is moving on the court, motion data on the motion of the player character 100 and motion data on dribbling generated in accordance with the position input through the touch panel 13 are blended and reproduced. Even while the player character 100 moves on the court, the player can perform input with an intuitive determination, and change the position where the player character 100 dribbles the ball 110.

Although all motion data used for the dribble motion of the player character 100 conclusively becomes different motion data in accordance with the difference in the positions input through the touch panel 13, only motion data associated with the specific coordinate positions 201 to 206, and 221 to 224 may be stored in the ROM 171 of the game cartridge 17 beforehand. Thus, the memory capacity of the ROM 171 necessary for storing the motion data beforehand can be of relatively small size.

Motion data subject to blending in plural pieces of motion data previously stored in the ROM 171 are only two or four pieces of motion data which are selected in accordance with the specific coordinate positions related to the position input through the touch panel 13. For example, in a case where the position T shown in FIG. 4B is input, the specific coordinate positions 201, 202, 204 and 205, which are relatively near from the input position T, are selected. Motion data associated with the specific coordinate position other than the specific coordinate positions 201, 202, 204, and 205 shows a motion having nothing to do with the position input through the touch panel 13. Accordingly, motion data associated with the specific coordinate position other than the specific coordinate positions 201, 202, 204, and 205 is not selected as motion data subject to blending. Only two or four pieces of motion data in the total of twelve kinds (six kinds for each hand of the player character 100) of motion data stored in the ROM 171 are subject to blending. Accordingly, calculation of blend ratios and a process load placed on, for example, the CPU core 21 for the process of blending motion data does not become too large.

The values of the blend ratios for motion data associated with the selected two or four specific coordinate positions are set higher for motion data associated with specific coordinate positions closer to the position input through the touch panel 13. This facilitate the user to predict how the player character's 100 motions are affected by which position the user inputs, so that the game does not become complex. In the second LCD 12, below the touch panel 13, an image of the player character 100 positioned at the center and the other characters 101 to 104, and 121 to 125 is displayed. This facilitates the user (or player) to determine which position in the tough panel 13 should be input in accordance with the progress of the game.

The blend ratios for motion data associated with the selected two or four specific coordinate positions are calculated as shown in FIGS. 4B and 4C. The CPU core 21 can calculate the blend ratio for motion data associated with each specific coordinate position by using addition, subtraction, multiplication, and division, which are relatively easy computations, and the process load required for calculating the blend ratios does not become too large.

In a case where the position input through the touch panel 13 matches with one of the specific coordinate positions 201 to 206, and 221 to 224, motion data associated with the specific coordinate position matching with the input position may be directly used to make the player character 100 perform a dribble motion. Thus, the CPU core 21 does not need to execute excessive processing in order to obtain motion data for the motion of the player character 100, so that the process load placed on the processor becomes small.

The game according to an embodiment is a basketball game in which a case where the player character 100 moves a position on the court and a case where the player character 100 does not move are possible. In the game, an offense team and a defense team may change over, and a different character may newly become a player character 100 who dribbles the ball 110 by passing the ball 110 between characters, In a case where the player character 100 stops moving on the court, and in a case where a different character becomes a new player character 100, the new player character 100 performs a dribble motion using motion data associated with, for example, the specific coordinate position 201. Motion data employed as a default does not need motion blending, so that no excessive process load is placed on the CPU core 21.

Possible dribble motions of the ball 110 by the player character 100 are a motion of dribbling by a right hand and a motion of dribbling by a left hand. For example, as a range in the areas (2), (3), (5), (6), (8), and (9) of the touch panel 13 is input while the player character 100 is dribbling the ball 110 with the right hand, the player character 100 keeps dribbling with the right hand in motion data newly generated. The player character 100 shifts the ball 110 from the right hand to the left hand only when a range in the areas (1), (4), and (7) of the touch panel 13 is input. Regarding an input of a point in the areas (3), (6), and (9) through the touch panel 13, when the player character 100 is dribbling the ball 110 with the left hand, inversion of right and left is applied.

When the areas (2), (5), and (8), which correspond to the central column in the touch panel 13, are input, the specific coordinate positions subject to blending of motion data are selected in such a way that the player character 100 keeps dribbling with the right hand after inputting if the player character 100 dribbles with the right hand at the time of the inputting. When the areas (2), (5), and (8) of the touch panel 13 are input, the specific coordinate positions subject to blending of motion data are selected in such a way that the player character 100 keeps dribbling with the left hand after inputting if the player character 100 dribbles with the left hand at the time of the inputting. The CPU core 21 can prevent the player character 100 from changing the hand used to dribble the ball 110 too frequently and unnaturally, and can prevent the user (player) from perceiving the player character's motions as unnatural.

The CPU core 21 determines whether the player character 100 dribbles the ball 110 with the right or left hand when a new input is made through the touch panel 13, and not by checking the motion state of the player character 100 at the time of the input. The CPU core 21 determines whether the player character 100 dribbles the ball 110 with the right or left hand when a new input is made through the touch panel 13 from a relationship between an area including the position input through the touch panel 13 last time and an area including the position input this time. The CPU core 21 can determine whether or not the hand of the player character 100 dribbling the ball 110 should be changed over with a relatively small amount of calculation.

When the hand of the player character 100 dribbling the ball is changed over (from the right hand to the left hand, or the left hand to the right hand), the CPU core 21 does not directly shift motion data before an input is made through the touch panel 13 to motion data after the input is made through the touch panel 13. When the player character 100 changes over the hand dribbling the ball 110, the CPU core 21 shifts the motion data once before the input is made through the touch panel 13 to motion data on a link motion, and then shifts the motion data on the link motion to motion data after the input is made through the touch panel 13.

The link motion is inserted when areas including the position input last time are (1) to (3) and areas including the position input this time are (7) to (9), or when the areas including the position input last time are (7) to (9) and the areas including the position input this time are (1) to (3). The CPU core 21 determines whether or not the link motion is inserted including change over of the hand dribbling the ball 110 from the relationship between the area including the position input through the touch panel 13 last time and the area including the position input through the touch panel 13 this time. Accordingly, the CPU core 21 can determine insertion of the link motion with a relatively small amount of calculation.

In a case where the difference between pieces of motion data used before and after the input is made through the touch panel 13 is large, notion data is not shifted immediately between those pieces of motion data (for example, before the input is made through the touch panel 13 and after the input is made through the touch panel 13). In a case where the difference between the pieces of motion data used before and after the input is made through the touch panel 13 is large, as the player character 100 is moved once using motion data on a link motion, the CPU core 21 makes the player character 100 take motion without the user (player) perceiving the player character's motions as unnatural before and after the input is made through the touch panel 13.

The player can instruct motions of the player character 100 other than dribbling of the ball 110 through an input from the operation switch unit 14. The player character 100 moves on the court formed in virtual 3D space, and changes the direction in accordance with, for example, an input from the direction indicating switch 14c. The player can make the player character 100 perform various motions other than dribbling of the ball 110 to progress the game by making an input though an input device other than the touch panel 13, as will be readily appreciated by the skilled artisan without departing from the spirit and/or scope of the invention.

In a case where an input is made through the direction indicating switch 14c, the player character 100 moves in an input direction on the court while dribbling the ball 110. In considering the motion of a basketball player in the real world, handling of the ball 100 becomes easy when the ball 110 is in front of a body. In the basketball game according to the exemplary embodiment, the moving speed of the player character 100 is changed according to an angle between a direction from the player character 100 to the ball 110 and the moving direction of the player character 100 (i.e., a direction input through the direction indicating switch 14c). The user (player) can move the player character 100 at a natural speed in accordance with a position where the player character 100 dribbles the ball 110.

In the basketball game according to the embodiment, in a case where an input is made through the direction indicating switch 14c, the route direction 110R of the player character 100 is shifted in such a way that a direction that the player character 100 is headed (the route direction 100R) is not shifted from the moving direction to prevent the player from perceiving the motions as unnatural. In considering the motion of a basketball player in the real world, if the ball is in the moving direction of the player beforehand, the player can be headed in the moving direction while handling the ball in front of the body by only turning around the basketball player's body. If the ball 110 is not in the moving direction of the basketball player beforehand, turning around the player's body is not enough to handle the ball in front of the body.

In a case where a direction input through the direction indicating switch 14c differs from the route direction 100R of the player character 100, provided that the ball 110 is within a range of $+/-\theta 3$ from the direction input through the direction indicating switch 14c, a quick turn of changing the route direction 100R of the player character 100 without changing the position of the ball 110 is performed, When the direction of the player character 100 is changed to a direction in accordance with the direction input through the direction indicating switch 14c by the quick turn, the player can change the direction of the player character 100 at a natural speed.

As explained above, the motion of the player character automatically changes in accordance with a difference in a position where the player character 100 dribbles the ball 110. Even if there are few kinds of input operations by the player, the player character 100 can perform natural motion in accordance with a position where the player character 100 dribbles the ball 110. The game does not become too complex for making the player character 100 carry out natural motions.

The present invention is not limited to the foregoing embodiment, and can be modified and applied in various forms. Some modified examples of the foregoing embodiment to which the present may be applied will be explained below.

In the above embodiment, an explanation has been provided for the case where the blend ratios for motion data corresponding to the specific coordinate positions 201 to 206 are calculated based on distances between a position input through the touch panel 13 and the specific coordinate positions 201 to 206 for each x coordinate and y coordinate. However, the method of calculating the blend ratios for motion data associated with the specific coordinate positions 201 to 206 is not limited to this case, and the blend ratios may be calculated based on the lengths of the straight lines between the position input through the touch panel 13 and the specific coordinate positions 201 to 206, or based on squares of the lengths of the straight lines.

In the above embodiment, the motion data for causing the player character 100 to take a motion is obtained by blending the plural pieces of motion data associated with the respective specific coordinate positions 201 to 206 according to a position input through the touch panel 13. However, the method of determining motion data for causing the player character 100 to take a motion is not limited to this method, but motion data associated with any one of the specific coordinate positions 201 to 206 which is nearest to the position input through the touch panel 13 may be used directly. In this case, it is unnecessary to blend motion data.

Only when a position on the touch panel 13 lying in a predetermined range from the specific coordinate positions 201 to 206 (e.g., the range of +/−10 for both the x coordinate and the y coordinate), motion data associated with the specific coordinate positions 201 to 206 may be used directly to make the player character 100 take a motion. When a position outside of the predetermined range is input, motion data is blended according to the input position in the manner of the embodiment described above, and the player character 100 is made to take a motion using the blended motion data.

In the above embodiment, motion data which defines the motion of the player character 100 is prepared in association with the specific coordinate positions 201 to 206 on the touch pane) 13, However, motion data may be prepared in association with the areas (1) to (9) set on the touch panel 13. In this case, when any position in the range of the area (1) of the touch panel 13 is input, the motion data that is stored in the ROM 171 in association with the area (1), so that the player character 100 can take a motion using the selected motion data.

When the area on the touch panel 13 is separated into areas of a 5×5 matrix, for example, motion data may be prepared only for those areas which are not included in the second and fourth rows or the second and fourth columns In this case, given that an area in the m-th row and the n-th column is expressed by an area (m, n), when a position in any one of the ranges of areas (1, 1), (1, 3), (1, 5), (3, 1), (3, 3), (3, 5), (5, 1), (5, 3) and (5, 5) is input, the player character 100 can be made to take a motion by directly using the motion data associated with the input area.

When a position in the range of an area other than the areas (1, 1), (1, 3), (1, 5), (3, 1), (3, 3), (3, 5), (5, 1), (5, 3) and (5, 5) is input, the player character 100 can be made to take a motion by using blended motion data. When a position in the range of an area (1, 2) is input, for example, motion data associated with the area (1, 1) and motion data associated with the area (1, 3) are blended (respective blend ratios being 50%), and the player character 100 can be made to take a motion by using the blended motion data. When a position in the range of an area (2, 2) is input, motion data associated with the area (1, 1), motion data associated with the area (1, 3), and motion data associated with the area (3, 1), and motion data associated with the area (3, 3) are blended (respective blend ratios being 25%), and the player character 100 can be made to take a motion by using the blended motion data.

Moreover, the invention is not limited to any specific array of areas, but may be used with any number of two-dimensional areas (m×n), where m and n are integers greater than, or equal to 1. Nor is the invention limited to two-dimensional areas, but may be used with three-dimensional areas (for example, in the case of three dimensional inputs); or k dimensional areas, where k is an integer greater than three. Examples of k-dimensional areas may include cases where a user is able to input selection points having, for example, four dimensions (x, y, and z spatial coordinates, and t, a time coordinate).

In the above embodiment, when the player character 100 moves on the court according to the player's manipulation of the direction indicating switch 14c, the player character 100 moves in the direction input from the direction indicating switch 14c while dribbling the ball 110. When the player character 100 moves on the court, motion data for the movement, that is determined according to the direction input from the direction indicating switch 14c, and motion data for the dribble, that is determined according to the coordinates of the position input through the touch panel 13, are blended. Depending on the direction in which the player character 100 moves (for example, one of the eight directions input from the direction indicating switch 14c), however, the motion data for the dribble that is generated according to the position input through the touch panel 13 alone may give an unnatural feeling between the motion data associated with the moving direction and the dribbling action.

When the player character 100 moves on the court, dribble motion data to be blended with motion data of the movement may be generated according to the moving direction of the player character 100 (for example, the direction input from the direction indicating switch 14c). In this case, the coordinates of the position input through the touch panel 13 can be transformed by a calculation equation according to the moving direction of the player character 100, and dribble motion data can be generated according to the positional relationship between the coordinates transformed by the calculation equation and the specific coordinate positions 201 to 206. Whether or not to insert a link motion can be determined according to the positional relationship between the transformed coordinates and the coordinates of the specific coordinate positions 201 to 206.

When the player character 100 moves on the court, the player character 100 can dribble the ball 110 in such a state as not to give an unnatural feeling with respect to the moving motion. The position at which the player character 100 dribbles the ball 110 can be changed by an input of a position input through the touch panel 13.

In the above embodiment, determination on whether or not to cause the player character 100 to change the hand to dribble the ball 110, and determination on whether or not to insert a link motion are made based on the positional relationship between the previous and current positions input through the touch panel 13. However, determination of a difference between the route direction 100R of the player character 100 and the direction input from the direction indicating switch 14c may also be made. Determination on the direction toward the ball 110 from the player character 100 may also be made based on the positional relationship between the previous and current positions input through the touch panel 13.

Because there are, for example, eight directions which can be input from the direction indicating switch 14c, and there are other areas, other than the center area (5), on the touch panel 13 in the eight directions, all the directions should be determined with those eight directions as a unit. For example, the direction toward the ball 110 from the player character 100 may be determined by checking if the direction lies in any one of eight angular ranges obtained by equiangularly separating the direction toward the ball 110 from the player character 100 according to the direction toward the player character 100 from the view point of the virtual camera. This facilitates the process for comparing different target directions with each other In the above embodiment, when there is a directional input from the direction indicating switch 14c, the player character 100 moves in the input direction at the speed of $V \cos(\theta/2)$ where $\theta$ is the angle defined by the direction toward the ball 110 from the player character 100 and the input direction. In this case, the moving speed of the player character 100 continuously changes according to the size of $\theta$. Instead of the scheme, the angle $\theta$ defined by the direction toward the ball 110 from the player character 100 and the input direction may be compared with a predetermined threshold (or possibly a plurality of predetermined thresholds), the player character 100 may be moved at a predetermined speed V1 when $\theta$ is equal to or less than the threshold(s), and the player character 100 may be moved at a speed V2 slower than V1 when $\theta$ is larger than the threshold(s). In this case, the moving speed of the player character 100 may be changed stepwise depending on whether θ is greater than the threshold(s).

In the above embodiment, in a case where the route direction 100R of the player character 100 does not match with the direction input through the direction indicating switch 14c, if the ball 110 lies within the range of +/−θ3 from the input direction, the player character 100 makes a quick turn at the position where the player character 100 is present. If the input is actually made through the touch panel 13 when the input is made through the direction indicating switch 14c, however, the player character 100 may make a quick turn regardless of the position of the ball 110 as long as the direction toward the input position from the player character 100 is within the range of +/−θ3 from the input direction.

In the above embodiment the area on the touch panel 13 is divided into nine areas, and determination on whether or not to insert a link motion is made in accordance with the relationship between an area including a position input previously and an area including a position input later. Determination on whether or not to insert a link motion is not limited to the foregoing way, and may be made in accordance with the relationship between the position input previously itself and the position input later itself. The method of determining whether or not to insert a link motion may be made in accordance with the relationships between a specific coordinate position in the specific coordinate positions 201 to 206 nearest to the position input previously and a specific coordinate position nearest to the position input later.

In the above embodiment, an explanation has been provided with respect to the case where the positional relationship between the player character 100 and the ball 110 is determined from the direction from the player character 100 toward the ball 110. The method of determining the positional relationship between the player character 100 and the ball 110 is not limited to this example, and the positional relationship there-between may be, for example, determined based on the direction from the player character 100 toward the ball 110 and the distance between the player character 100 and the ball 110.

In the above embodiment, only the ball 110 is the object subject to determination of the positional relationship with respect to the player character 100, however, there may be two or more objects.

In the above embodiment, the invention is applied to the player character 100 dribbling the ball 110 in the basketball game, but may be applied to a player character in any game, such as, but not limited to, for example, a soccer game, a baseball game, a tennis game, a football game, a cricket game, a polo game, etc. An object which affects the motion of the player character may be an object other than the ball. The object which affects the motion of the player character may be movable completely independent from the motion of the player character in virtual 3D space. The motion blending scheme shown in FIGS. 6 and 11 may be applied to a player character which does not handle an object like a ball. The scheme of the motion and direction change of the player character shown in FIGS. 7, 8, and 11 may be applied to a two-dimensional video game.

In the above embodiment, the player inputs a coordinate position through the touch panel 13 provided in front of the second LCD 12. However, the touch panel 13 may not be provided in front of the display device like the second LCD 12. A device for inputting a coordinate position is not limited to the touch panel 13, but may be, for example, another pointing device like a mouse for inputting coordinates based on the position of the cursor displayed on the display device, an optical pointing device that includes an optical transducer, a head-mounted eye tracking system that allows a wearer to control movement and selection using the wearer's eye movement, or any other mechanism, as the skilled artisan will appreciate, that may be used as an input device to provide input controls to a computer and/or game console without departing from the spirit and/or scope of the invention.

Although the embodiment has been described with the displays 11 and 12 being liquid crystal displays, the skilled artisan will readily appreciate that the display devices may, instead, be projection displays, holographic displays, micro-mirror displays, plasma displays (PDPs), cathode ray tube displays (CRT), light emitting diode displays (LED), organic light emitting diode displays (OLED), surface-conduction electron-emitting displays (SED), carbon-nanotubes, nanocrystal displays, or the like, without departing from the spirit and/or scope of the invention. Moreover, the display housing is not limited to a portable device as illustrated in the exemplary embodiment of FIG. 1, but me be a desk top computer device, a telephone device, or an array of devices interconnected via wireless or wired communication. The display device(s) may be attachable to a user via a head mount display system, or the like.

Although sound is generated, for example, by a non-limiting speaker 15 in the exemplary embodiment, the skilled artisan will readily recognize that any other sound generation device may be used, including earphones, sound generation devices that cause fixed surfaces, such as, for example, walls or ceilings, to vibrate in accordance with sound signals, or for the hearing impaired, additional display devices may be included that generated visually perceivable signals that are synchronized with images displayed by the display devices 11 and/or 12, without departing from the spirit and/or scope of the invention. In the above embodiment, the basketball game to which the present invention is applied is executed in the game device 1 having the two display devices, the first LCD 11 and the second LCD 12 and the pointing device or the touch panel 13. However, a computer device other than the game device 1 may execute a game to which the invention is applied as long as the computer device has at least a display device for displaying the image of the game, and a pointing device which enables the user to input a desired coordinate position. The computer device that executes the game to which the invention is applied may be a game dedicated machine or a general-purpose machine like a personal computer. The computer device that executes the game to which the invention is applied may be of a portable type or a desk top type. A cellular phone may be used as the computer device that executes the game to which the invention is applied. Moreover, the displays are not limited to two LCDs, but may include any number of displays, including plasma displays, micromirror displays, projection displays, etc., as the skilled artisan will readily appreciate without departing from the spirit and/or scope of the invention.

In the above embodiment, the game program which is executed by the game device 1 and data are stored in the ROM 171 in the game cartridge 17 and distributed. However, a recording medium which stores the game program which is executed by the game device 1 and data is not limited to the game cartridge 17, and may be an optical and/or magnetic disk device (such as, for example, flexible disk, CD-ROM, DVD-ROM, or the like) in accordance with the computer device to be the platform. Or, the game may be delivered directly through a wired or wireless connection from a network or other device, where the network may include the Internet, a wide area network, local network, or the like. In a case where the platform is a computer device having a fixed disk device, the game program which is executed by the game device 1 and data may be stored on the fixed disk device or downloaded beforehand.

In a case where a computer device which can communicate with another computer device over a network is used as the platform, the game program which is executed by the game device 1 and data may be stored on a fixed disk device of a server device present over the network, and may be distributed thereover.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and are not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

An Abstract of the Disclosure is provided to comply with 37 C.F.R. and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An image generating apparatus that generates an image of a virtual space where a first object and a second object are present, comprising:
    a motion input unit that inputs a motion instruction that causes the first object to take a motion in the virtual space according to an operation of an operator;
    a positional relationship determining unit that determines a positional relationship, between the first object and the second object when the motion instruction is input, the positional relationship including at least a direction from the position of the first object toward a position of the second object;
    an object motion unit that causes the first object to take a motion according to the input motion instruction such that the speed of the first object in response to a same motion instruction differs depending on the positional relationship between the first object and the second object;
    an image generating unit that generates the image of the virtual space including the first object and the second object; and
    a display control unit that displays the generated image of the virtual space,
    wherein the motion input unit includes a direction input unit that inputs a moving direction of a plurality of predetermined directions to move a position of the first object from a current position,
    the object motion unit includes an object moving unit that moves the first object in the input moving direction at a speed according to the input moving direction and the positional relationship between the first object and the second object,
    the object motion unit moves the first object faster as an angle defined by the input moving direction and the direction from the position of the first object toward the position of the second object becomes smaller.

2. The image generating apparatus according to claim 1, wherein the object motion unit includes an object direction changing unit that changes the direction of the first object according to the input moving direction such that the first object faces in different directions according to the positional relationship between the first object and the second object and the input moving direction.

3. The image generating apparatus according to claim 1, wherein
    the image generating apparatus further comprises a first object direction detecting unit that detects a direction in which the first object faces, when the moving direction is input, and
    the object motion unit causes the first object to take a motion such that the speed differs according to the positional relationship between the first object and the second object, the facing direction of the first object, and the input moving direction.

4. The image generating apparatus according to claim 3, wherein the object motion unit includes an object direction changing unit that changes the direction of the first object according to the input moving direction such that the first object faces in different directions according to the positional relationship between the first object and the second object, the facing direction of the first object, and the input moving direction.

5. The image generating apparatus according to claim 4, further comprising:
a first direction determining unit that determines whether the input moving direction lies within a first specific range with respect to the direction from the position of the first object toward the position of the second object; and
a second direction determining unit that determines whether the input moving direction is outside of a second specific range with respect to the direction in which the first object faces, and
the object direction changing unit changes the direction of the first object in the input moving direction when it is determined that the input moving direction lies within the first specific range, faster than when it is determined that the input moving direction is outside of the first specific range, where it is determined that the input moving direction is outside the second specific range.

6. The image generating apparatus according to claim 5, wherein the object direction changing unit changes the direction of the first object in the input moving direction without moving the position of the first object when it is determined that the input moving direction is outside the second specific range and lies within the first specific range.

7. The image generating apparatus according to claim 5, wherein the first direction determining unit determines that the input moving direction lies within the first specific range when the input moving direction is substantially identical to the direction from the position of the first object toward the position of the second object, and
the second direction determining unit determines that the input moving direction lies within the second specific range when the input moving direction is substantially identical to the direction in which the first object faces.

8. The image generating apparatus according to claim 1, wherein the direction input unit inputs the moving direction according to the operation of the operator, the image generating apparatus further comprising:
an object movement unit that moves the first object in the input moving direction;
a coordinate position input unit that inputs a coordinate position on a two-dimensional plane according to the operation of the operator;
a positional relationship setting unit that sets a positional relationship between the first object and the second object based on the input coordinate position; and
a second object disposing unit that disposes the second object at a position in the virtual space according to the set positional relationship with respect to the moved position of the first object, wherein
the image generating unit generates the image of the virtual space including the moved first object and the second object; and
the display control unit displays the generated image of the virtual space including the moved first object and the second object.

9. The image generating apparatus according to claim 8, further comprising a motion data determining unit that determines motion data defining a motion of the first object according to the positional relationship set by the positional relationship setting unit, and
wherein the object movement unit moves the first object using the determined motion data.

10. The image generating apparatus according to claim 8, wherein the positional relationship setting unit sets the positional relationship between the first object and the second object based on a positional relationship between the input coordinate position and a specific coordinate position preset on the two-dimensional plane.

11. An image generating apparatus that generates an image of a virtual space where a first object and a second object are present, comprising:
a program storage that stores a program;
a processor that executes the program;
a motion input device that inputs a motion instruction that causes the first object to take a motion according to an operation of an operator, the motion input device including a direction input device that inputs a moving direction of a plurality of predetermined directions to move a position of the first object from a current position; and
a display device that displays an image,
the program including:
a first code section that determines a positional relationship between the first object and the second object when the motion instruction is input, the positional relationship including at least a direction from the position of the first object toward a position of the second object;
a second code section that causes the first object to take a motion according to the input motion instruction such that the speed of the first object in response to a same motion instruction differs depending on the positional relationship between the first object and the second object;
a third code section that generates the image of the virtual space including the first object and the second object; and
a fourth code section that displays the generated image,
wherein the second code section causes the first object to move in the input moving direction and to move faster as an angle defined by the input moving direction and the direction from the position of the first object toward the position of the second object becomes smaller.

12. The image generating apparatus according to claim 11, wherein the direction input device inputs the moving direction according to the operation of the operator, the image generating apparatus further comprising:
a coordinate position input device that inputs a coordinate position on a two-dimensional plane according to the operation of the operator,
the program further including:
a fifth code section that moves the first object in accordance with the input moving direction;
a sixth code section that sets a positional relationship between the first object and the second object based on the input coordinate position on the two-dimensional plane;
a seventh code section that generates the image of the virtual space including the moved first object and the second object; and
an eighth code section that displays the generated image including the moved first object and the second object on the display device.

13. A method of generating an image of a virtual space where a first object and a second object are present, the method being executed by a computer device having a motion input device that inputs a motion instruction that causes the first object to take a motion according to an operation of an operator, the motion input device including a direction input device that inputs a moving direction of a plurality of predetermined directions to move a position of the first object from a current position, and a display device that displays an image, the method comprising:

determining a positional relationship between the first object and the second object when the motion instruction is input, the positional relationship including at least a direction from the position of the first object toward a position of the second object;

causing the first object to take a motion according to the input motion instruction such that the speed of the first object in response to a same motion instruction differs depending on the positional relationship between the first object and the second object;

generating the image of the virtual space including the first object and the second object; and displaying the generated image on the display device, wherein the first object is moved in the input moving direction and is moved faster as an angle defined by the input moving direction and the direction from the position of the first object toward the position of the second object becomes smaller.

14. The method according to claim 13, wherein the direction input device inputs the moving direction according to the operation of the operator, and the computer executing the method further has a coordinate position input device that inputs a coordinate position on a two-dimensional plane according to the operation of the operator, the method further comprising:

moving the first object in accordance with the input moving direction;

setting a positional relationship between the first object and the second object based on the input coordinate position on the two-dimensional plane;

generating the image of the virtual space including the moved first object and the second object; and displaying the generated image including the moved first object and the second object on the display device.

15. A non-transitory computer readable recording medium comprising a program for generating an image of a virtual space where a first object and a second object are present, the program being executed by a computer device having a motion input device that inputs a motion instruction for causing the first object to take a motion according to an operation of an operator, the motion input device including a direction input device that inputs a moving direction of a plurality of predetermined directions to move a position of the first object from a current position, and a display device that displays an image, the program comprising:

a first code section that determines a positional relationship between the first object and the second object when the motion instruction is input, the positional relationship including at least a direction from the position of the first object toward a position of the second object;

a second code section that causes the first object to take a motion according to the input motion instruction such that the speed of the first object in response to a same motion instruction differs depending on the positional relationship between the first object and the second object;

a third code section that generates the image of the virtual space including the first object and the second object; and a fourth code section that displays the generated image on the display device, wherein the second code section causes the first object to move in the input moving direction and to move faster as an angle defined by the input moving direction and the direction from the position of the first object toward the position of the second object becomes smaller.

16. The computer readable recording medium according to claim 15, wherein the direction input device inputs the moving direction according to the operation of the operator, and the computer further has a coordinate position input device that inputs an arbitrary coordinate position on a two-dimensional plane according to the operation of the operator, the program further including:

a fifth code section that moves the first object in the input moving direction;

a sixth code section that sets a positional relationship between the first object and the second object based on the input coordinate position on the two-dimensional plane;

a seventh code section that generates the image of the virtual space including the moved first object and the second object; and an eighth code section that displays the generated image including the moved first object and the second object on the display device.

\* \* \* \* \*